United States Patent
Arnold et al.

(10) Patent No.: US 10,699,352 B2
(45) Date of Patent: *Jun. 30, 2020

(54) METHOD FOR CONTROLLING A POWER SUPPLY SYSTEM

(71) Applicant: Viessmann Werke GmbH & Co. KG, Allendorf (DE)

(72) Inventors: Christian Arnold, Neuhof-Rommerz (DE); Martin Bock, Frankenau (DE); Andrej Grad, Bromskirchen (DE); Tobias Maurer, Allendorf (DE); Reinhard Osterloh, Winterberg (DE); Jörg Timmermann, Battenberg (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,661

(22) PCT Filed: Mar. 23, 2017

(86) PCT No.: PCT/EP2017/056927
§ 371 (c)(1),
(2) Date: Sep. 23, 2018

(87) PCT Pub. No.: WO2017/162793
PCT Pub. Date: Sep. 28, 2017

(65) Prior Publication Data
US 2019/0114724 A1    Apr. 18, 2019

(30) Foreign Application Priority Data
Mar. 24, 2016    (DE) .......................... 10 2016 205 036

(51) Int. Cl.
*G05B 19/00*    (2006.01)
*G06Q 50/06*    (2012.01)
(Continued)

(52) U.S. Cl.
CPC ............. *G06Q 50/06* (2013.01); *F24D 19/10* (2013.01); *F24H 9/20* (2013.01); *F24H 9/2007* (2013.01);
(Continued)

(58) Field of Classification Search
None
See application file for complete search history.

(56) References Cited

U.S. PATENT DOCUMENTS

| | | | |
|---|---|---|---|
| 2005/0096872 A1 | 5/2005 | Blevens et al. | |
| 2007/0038321 A1 | 2/2007 | McDonald et al. | |

(Continued)

FOREIGN PATENT DOCUMENTS

| | | |
|---|---|---|
| DE | 10348563 A1 | 5/2004 |
| DE | 202006001553 U1 | 8/2006 |

(Continued)

OTHER PUBLICATIONS

International Search Report dated Jun. 30, 2017 for PCT App. Ser. No. PCT/EP2017/056927.

*Primary Examiner* — Paul B Yanchus, III
(74) *Attorney, Agent, or Firm* — Henricks Slavin LLP

(57) ABSTRACT

The invention relates to a method of controlling an energy supply system comprising at least two energy generators each configured to provide at least one form of energy of heat and/or cold and/or electrical energy. The energy supply system further comprises one closed-loop controller per energy generator for controlling the energy generator and a control device coordinatedly controlling the closed-loop controllers. The control device detects an energy supply request for providing energy in the form of heat and/or cold and/or electrical energy and determines for each energy form which energy generators are required to meet the energy supply request. For each energy form, the control device (Continued)

|    | E1  | E2  | E3        | E4  | E5  |
|----|-----|-----|-----------|-----|-----|
| F1 | ON  | OFF | Hard OFF  | ON  | OFF |
| F2 | ON  | OFF | Hard OFF  | OFF | N/A |
| F3 | OFF | ON  | Hard OFF  | N/A | N/A |

|    | E1  | E2  | E3        | E4  | E5  |
|----|-----|-----|-----------|-----|-----|
| F1 | ON  | FA  | Hard OFF  | ON  | OFF |
| F2 | FA  | FA  | Hard OFF  | FA  | N/A |
| F3 | FA  | ON  | Hard OFF  | N/A | N/A | generates switch-on requests for the energy generators required to meet the energy supply system and switch-off requests for the energy generators not required. For each energy generator, the control device determines if one, several or no switch-off request is present and if one, several or no switch-off request is present. For each energy generator for which there is at least one switch-on request present, a switch-on request is output to the corresponding closed-loop controller and, for each energy generator for which there is no switch-on request and at least one switch-off request present, a switch-off request is output to the corresponding closed-loop controller.

17 Claims, 8 Drawing Sheets

(51) Int. Cl.
*F24D 19/10* (2006.01)
*H02J 3/14* (2006.01)
*F24H 9/20* (2006.01)

(52) U.S. Cl.
CPC ............ *H02J 3/14* (2013.01); *F24D 2200/32* (2013.01); *F24H 2240/00* (2013.01); *F24H 2240/10* (2013.01); *Y02B 30/762* (2013.01); *Y02B 70/3275* (2013.01); *Y04S 20/244* (2013.01)

(56) References Cited

U.S. PATENT DOCUMENTS

| | | |
|---|---|---|
| 2007/0233286 A1 | 10/2007 | Ishikawa et al. |
| 2011/0012427 A1 | 1/2011 | Craig et al. |
| 2011/0071690 A1 | 3/2011 | Sun et al. |
| 2013/0140885 A1 | 6/2013 | Craig et al. |
| 2015/0316902 A1* | 11/2015 | Wenzel .................. G05B 15/02 700/291 |
| 2017/0031962 A1* | 2/2017 | Turney .................. G05B 15/02 |

FOREIGN PATENT DOCUMENTS

| | | |
|---|---|---|
| DE | 102008063954 B3 | 7/2010 |
| EP | 1202425 A2 | 5/2002 |
| EP | 2144130 A1 | 1/2010 |
| EP | 2187136 A2 | 5/2010 |
| WO | WO 2008/091970 A2 | 7/2008 |
| WO | WO 2009/141176 A1 | 11/2009 |

\* cited by examiner

| | E1 | E2 | E3 | E4 | E5 |
|---|---|---|---|---|---|
| F1 | ON | OFF | Hard OFF | ON | OFF |
| F2 | ON | OFF | Hard OFF | OFF | N/A |
| F3 | OFF | ON | Hard OFF | N/A | N/A |

| | E1 | E2 | E3 | E4 | E5 |
|---|---|---|---|---|---|
| F1 | ON | FA | Hard OFF | ON | OFF |
| F2 | FA | FA | Hard OFF | FA | N/A |
| F3 | FA | ON | Hard OFF | N/A | N/A |

METHOD FOR CONTROLLING A POWER SUPPLY SYSTEM

The present invention relates to a method of controlling an energy supply system comprising at least two energy generators which provide energy in form of heat and/or cold and/or electrical energy. The invention further relates to a control device for controlling an energy supply system.

A method of operating a system comprising a plurality of heat generating means is known, for example, from EP 2187136 A2. The system may provide heat power using a plurality of heat generating means, wherein the allocation of the heat power to the individual heat generating means is variable so that they can be operated close to their optimal efficiency. The allocation of power may not only be performed by means of a higher-level boiler management system, but also be carried out by coordinating the individual heat generating means with each other.

From the International Patent Application WO 2009/141176 A1, a mobile heating system is known which comprises a plurality of fuel-operated heating devices which are in communication with each other via a bus system. The heating system is configured such that, when starting the heating system, one of the heating devices is configured based on predetermined rules as a master with respect to the control of other heating devices connected to the bus system. The remaining heating devices are configured as slaves.

The European Patent Application EP 2144130 A1 discloses a group management system that can control a plurality of devices collectively and allows flexibly adding or changing device groups.

A hybrid heating system comprising at least one condensing boiler and at least one non-condensing boiler is known from the International Patent Application WO 2008/091970 A2. Switching on or off the individual boilers is carried out by a control after determining the heat load, inter alia, based on the flow in the main line of the heating system as well as other starting criteria. The selection of the boilers is carried out based on the ambient temperature and the operating hours of the individual boilers.

The object of the present invention is to provide a method of controlling an energy supply system, whereby improved durability of the energy generator used can be achieved compared to prior art. In particular, a method of controlling an energy supply system is to be provided in which the number of switching on/off operations can be reduced. By means of the method according to the invention, the useful life of the energy generators can be distributed particularly evenly, whereby a careful operation and an improved durability of the energy generator can be achieved. Furthermore, a particularly safe operation of the energy supply system is achievable.

The inventors have recognized that, in particular, energy supply systems which provide various energy forms must meet a variety of requirements. On the one hand, there are a variety of different demand requirements. On the other hand, with a plurality of energy generators, a plurality of different restrictions on the providable power and/or current availability of the energy generators may exist. In order to operate the energy supply system according to demand, all the demand requirements and restrictions of the energy generators must be considered. The methods according to the invention for the first time make it possible to control such an energy supply system and, in particular, to control multivalent energy supply systems in a coordinated manner.

The object is achieved by a method of controlling an energy supply system, said energy supply system comprising at least two energy generators which are each adapted to provide at least one energy form such as heat and/or cold and/or electrical energy. Each energy generator also comprises a closed-loop controller for controlling the energy generator. The energy supply system comprises a control device for coordinated control of the closed-loop controllers, wherein said control device first detects an energy supply demand for providing energy in the form of heat and/or cold and/or electrical energy. For each energy form, the control device determines which energy generators are required to meet the energy supply request and generates switch-on requests for the energy generators required to meet the energy supply request and switching off requests for the energy generator not required to meet the energy supply request. For each energy generator, the control device determines if there is one, more than one, or no switch-on requests present, and if there is one is one, more than one, or no switch-off requests present.

According to a first aspect of the invention, for each energy generator for which the at least one switch-on request is present, the control device outputs a switch-on request to the corresponding closed-loop controller. For every energy generator for which no switch-on request and at least one switch-off request is present, the control device outputs a switch-off request to the corresponding closed-loop controller. Outputting the switch-on and/or switch-off requests thus is performed according to a rule "on before off".

The rule "on before off" ensures that all energy generators that receive at least one switch-on request are turned on or stay turned on. This rule can be implemented in a particularly simple manner, since there are usually no additional parameters which must be considered. The rule "on before off" means that, at any time, sufficient energy generators are operational to meet existing demand requirements.

According to a second aspect of the invention, the control device outputs, for each energy generator for which the at least one switch-off request is present, a switch-off request to the corresponding closed-loop controller. For each energy generator, for which no switch-off request and at least one switch-on request is present, the controller outputs a switch-on request to the corresponding closed-loop controller. Outputting the switch-on and/or switch-off requests thus takes place according to a rule "on before off". Thereby, a utilization of energy generators which is particularly evenly uniformly distributed to all energy generators can be achieved.

The rule "on before off" ensures that all energy generators which receive at least one switch-off request are turned off or remain turned off. This rule can be implemented very easily, since usually no additional parameters have to be considered. The rule "on before off" results in the lowest possible number of energy generators being in operation in order to meet current demand requirements. Thereby, a particularly high utilization of individual energy generators can be achieved.

According to a third aspect of the invention, the control device sets a priority for each energy form, such that each energy form is given a different priority. According to the set priorities, the control device, for each energy generator for which at least one switch-on request and at least one switch-off request of different energy forms are present, outputs that switch-on request or switch-off request which has been generated by the energy form with the respectively higher priority to the corresponding closed-loop controller. The priorities can be set either statically or dynamically depending on system parameters, for example.

This ensures that if several switch-on requests and/or switch-off requests are present for an energy generator of different energy forms, only the switch-on request or switch-off request of the energy form with the highest priority is output so that conflicts can be avoided. Furthermore, prioritizing the energy forms can ensure that the supply with an energy form deemed particularly important is always secured.

The object is also achieved by a method of controlling an energy supply system, said energy supply system comprising at least two energy generators which are configured to provide at least one energy form of heat and/or cold and/or electrical energy, respectively. Each energy generator also comprises a closed-loop controller for controlling the energy generator. The energy supply system comprises control device for coordinated control of the closed-loop controllers, wherein the control device performs the following method steps periodically at predetermined discrete times: first an energy supply request for providing energy in the form of heat and/or cold and/or electrical energy is detected. For each energy form, the control device determines which energy generators are required to meet the energy supply request and generates switch-on requests for energy generators required to meet the energy supply request and switch-off requests for energy generators not required to meet the energy supply request. For each energy form, the control device generates switch-on requests for energy generators required to meet the energy supply request and switch-off requests energy generators not required to meet the energy supply request.

According to a fourth aspect of the invention, the control device determines an energy generator adapted to simultaneously provide a first energy form and a second energy form for which, at a previous time, an switch-on request of the first energy form and a switch-off request for the second energy form was present and for which, at the current time, a switch-off request for the first energy form is present. If an energy supply request for providing the second energy form is present at the current time, the control device generates a switch-on request of the second energy form for the first energy generator.

Thereby it can be ensured that the first energy generator which at first provided energy of the first energy form is adopted to provide the second energy form. Thus, switching off the energy generator can be avoided. Furthermore, this ensures that a second energy generator for providing the second energy form does not need to be switched on. Avoiding switching-on and/or switching-off operations can increase the life of the energy generators. Furthermore, if energy generators ate left in operation for a long time, they can also be operated at optimum power output for a long time, whereby, for example, a particularly efficient and low-emission operation can be achieved.

In the context of the invention, an energy generator is "switched on" if the power provided by the energy generator energy exceeds a predetermined power threshold. Thus, for "switching on" an energy generator, the power provided by the energy generator is increased until the power provided by the energy generator is greater than the predetermined power threshold.

According to the invention an energy generator, is "switched off" if the power provided by the energy generator falls below a predetermined power threshold. For "switching off" of an energy generator, the power provided by the energy generator is decreased until the energy provided by the energy generator is less than the predetermined power threshold.

Preferably, the energy supply system is a multivalent energy supply system, the energy generators of which use a total of at least two different energy carriers.

A multivalent energy supply system is an energy supply system that uses more than one energy carrier as an energy source. It comprises at least two energy generators, each of which provides a usable energy form such as heat, cold, mechanical energy and/or electrical energy. Heat can be provided, for example, for a hot water supply and/or a heating system and/or as process heat, such as for industrial applications. For transporting the heat, typically a fluid carrier medium, i.e., a gas or a liquid is used, for example water or water vapor.

The at least two energy generators of a multivalent energy supply system use at least two different energy sources in total. As energy carriers fossil and/or renewable energy carriers may be used. For example, two or more from the following list may be used: coal, natural gas, fuel oil, diesel, gasoline, hydrogen, biogas, wood (for example in the form of pellets and/or chips), or other types of biomass, geothermal energy, solar radiation, wind, electrical energy (e.g., electrical current and/or voltage), long-distance heating, mechanical energy (e.g., water energy). By using different energy sources, the reliability of the energy supply can be improved since a dependency on the availability of an energy source (such as the sun and/or wind) can be reduced.

In particular, a multivalent energy supply system may use a combination of renewable and fossil fuels, so that a particularly reliable operation of the energy supply system can be achieved because a time-varying availability of the energy carriers used may be compensated by employing at least one other energy carrier. Thereby, the method according to the invention allows the control of the energy supply system to respond to conditions that change over time.

For example, an energy generator that uses the sun as an energy source cannot provide energy at night. A wind turbine cannot provide energy during a lull. In case of a heat pump, a minimum interval in which the heat pump may not be switched off or a period after a shutdown in which the heat pump may not switched on may be predetermined. All these and other specific characteristics may affect the operation of a multivalent energy supply system. The control device may therefore be configured to control the energy supply system based on the specific characteristics of the energy generator.

A multivalent energy supply system comprises at least two energy generators, each using at least one of the foregoing energy carriers to provide energy in the form of heat, cold and/or electrical energy, for example two or more from the following list which is a non-exhaustive list: oil-fired boiler, gas-fired boiler, condensing boiler, gas engine, gas turbine, combined heat and energy unit (CHP), wood boilers, (electrical) heat pump, photovoltaic system, wind turbine, thermal solar collector, fuel cell. In addition, combined heat and energy generation may be implemented, for example, with a Stirling engine.

in order to operate a multivalent energy supply system optimally, the control of the energy supply system have to be carried out based on the specific characteristics of the energy generators which depend, inter alia, on the type of energy carrier used. The present invention is aimed, among other things, at combining specific characteristics of energy generators in a synergetic manner. In other words, the method according to the invention allows optimally combining the respective merits of different energy carriers with each other, in particular with regard to the availability and/or energy content. This is achieved by coordinated control of the energy generators, so that from the multivalency of the energy supply system, i.e., the use of different energy carriers, an advantage over monovalent energy systems using only one energy carrier can be obtained.

The control of a multivalent energy supply system may be particularly complex and usually requires a customized solution tailored to the specific system configuration such as a programmable logic controller. Depending on the complexity of the multivalent energy supply system, the development effort and the associated costs for providing a system control can be very high. In addition, when installing a multivalent energy system, the configuration of a corresponding control can be very complicated and time-consuming. A preferred method aims at optimally controlling a multitude of different multivalent energy supply systems with differently structured infrastructures and different components. A preferred control device is configured to optimally control a plurality of different multivalent energy supply systems.

A control device according to the invention may be configured to carry out the method of controlling an energy supply system according to the invention. In particular, the control device may control a variety of different system configurations without being reprogrammed for each new or changed system configuration. Instead, the control device only needs to be reconfigured to control a different or changed system configuration with different boundary conditions.

Coordinated control of the closed-loop controllers means that the control device takes into account the totality of the energy generators in the energy supply system when determining the target values and/or when generating switch-on requests and/or when generating switch-off requests. In the presence of a plurality of energy supply requests for different energy forms, this may involve taking into account which energy generator can provide which energy form(s). Further, it may be necessary for the controller to determine if multiple energy generators are required to meet the energy supply request(s). When selecting the energy generators to meet the energy supply request(s), the controller may also take into account how much time the different energy generators require to reach a particular target value and/or if restrictions on the availability of an energy carrier utilized by the energy generators are present.

In order to allow a coordinated control of the closed-loop controllers, the control device may be configured to detect a plurality of specific characteristics of the energy generators and, if appropriate, to compare them to one another and/or to recognize and take into account dependencies between the energy generators. In particular, specific characteristics with regard to the power output of the energy generator can be taken into account in the control of the energy supply system. Specific power output characteristics include, among other things, a maximum power that can be provided by the energy generator and the time it takes for the energy generator to transition from a switched off operating condition to an optimal operating condition.

The various energy generators may have very different specific characteristics and may accordingly have different or even conflicting requirements during their operation in an energy supply system. In the following, typical specific characteristics of selected energy generators are described by way of example.

An oil-fired boiler or gas-fired boiler uses the fossil energy sources heating oil or natural gas and provides heat which is usually transferred to a fluid carrier medium, typically water. It can supply large power outputs within a short time and can be switched off quickly. Such a boiler is easy to control and can therefore be used in modulating operation. A boiler also allows frequent switch-on/off operations and may therefore also be used in two stages in on/off operation. Oil-fired boilers and gas-fired boilers are thus particularly flexible in their operation and are often used as so-called peak-load boilers which are to respond quickly to fluctuations in energy supply requests. The overall energy costs which take into account the costs of the energy carrier itself, as well as maintenance costs and the investment costs of the boiler, are at a medium level compared to other energy generators.

A combined heat and power plant (CHP) usually uses fossil energy sources, but could also operate on biogas or hydrogen derived from renewable sources. It supplies heat and electrical energy (electric current and/or electrical voltage), is easy to control and can quickly be ramped up to high power output and quickly shut down again. Unlike the boiler, however, the CHP should not be switched on or off frequently. In order to operate a CHP economically, it is usually used in continuous operation. Despite the high investment costs, the combined heat and power plant as a whole therefore has relatively low overall energy costs.

A wood boiler uses solid fuel from a renewable energy source (wood, for example in the form of pellets or wood chips) and provides heat. It is only moderately controllable and can only relatively slowly be ramped up to high power output or shut down again. Due to the long switching times, a wood boiler should not be switched on or off frequently. When switching off, for safety reasons it is usually necessary to wait until the fuel already in the combustion chamber is completely burnt. When switching on, however, first sufficient fuel must be transported into the combustion chamber and ignited. It causes relatively low overall energy costs. Therefore, it is usually used as a base load boiler which is as kept in continuous operation if possible and can meet a minimum energy demand of an energy supply system. In order to be able to react to fluctuations in the demanded amount of energy, a wood boiler is usually used in combination with a buffer storage which intermediately stores the heat provided by the wood boiler when the amount of heat demanded by the consumers is less than the amount of heat provided by the wood boiler. If the amount of heat demanded by the consumers is greater than the amount of heat provided by the wood boiler, first the amount of heat stored may be released from the buffer storage again. Alternatively or in addition to the buffer storage, a gas boiler is often used together with wood boilers in an energy supply system. The gas boiler is then turned on when the demanded amount of heat exceeds the amount of heat available from the wood boiler and from the buffer storage. The gas boiler is therefore used as a peak load boiler. Usually, wood boilers are operated in pairs so that at least one of the two wood boilers is always ready for operation.

An electric heat pump consumes electrical energy and therefore uses fossil and/or regenerative energy sources depending on which source the electrical energy was derived from. It can provide heat and/or cold, but has a limited temperature range. Usually, a heat pump can provide a maximum flow temperature of 60° C. It is easy to control and can quickly be ramped up to high power output and can also be quickly shut down again. However, it may not be switched on or off frequently. It causes relatively low overall energy costs.

Another component that is used in many energy supply systems is a buffer storage. The buffer storage may intermediately store energy provided by energy generators. Depending on the energy form, a buffer storage may be, for example, a storage for electrical energy, for example in the form of batteries or capacitors, or a heat storage and/or cold storage, for example in the form of an insulated water tank. In addition, energy can also be stored in the form of mechanical energy, for example in a flywheel. A buffer storage allows at least partial decoupling of the operation of the energy generators from the energy consumers. As a result, the efficiency of an energy supply system can be improved.

At least one of the energy generators of the energy supply system may be configured to simultaneously provide at least two energy forms. An example of this is a combined heat and power plant (CHP) which can provide both heat and electrical energy.

The method may further comprise a step of determining a first energy generator configured to simultaneously provide a first energy form and a second energy form, for example, heat and electrical energy, for which there is a switch-on request of the first energy form and a switch-off request of the second energy form present, that is, for example, a switch-on request for heat and a switch-off request for electrical energy are present. The first energy generator may be, for example, a CHP.

Furthermore, a second energy generator configured to provide the second energy form (e.g., electrical energy) for which a switch-on request of the second energy form is present may be determined. The control device can then be configured to generate a switch-on request of the second energy form for the first energy generator and a switch-off request of the second energy form for the second energy generator. The first energy generator may therefore take over the switch-on request of the second energy form from the second energy generator. This can advantageously occur, in particular, when, in an order of switching on for the second energy form, the first energy generator is placed behind the second energy generator and thus actually would only be switched on when the second energy generator is already switched on. However, since the first energy generator has already received a switch-on request of the first energy form, the control device recognizes that switching on the second energy generator may be avoided if the energy supply request can be met by the first energy generator.

In conventional control methods for a plurality of energy generators of an energy supply system, the individual energy generators are sequentially switched on or off along a predetermined order. Switching on the next energy generator in the sequence always takes place only when the current energy demand can no longer be met by the already switched on energy generators. Accordingly, energy generators are switched off only when the amount of energy provided exceeds the demand requested. Here, it can occur that an energy generator which can switched on or off and/or controlled only very slowly blocks the switch-on operation (or switch-off operation) of a subsequent energy generator in the sequence, so that a very long time may be necessary to meet a demand or to throttle the overall power output when demand is reduced.

In a further known control method for a plurality of energy generators of an energy supply system, the individual energy generators are switched on and/or off and controlled independently of one another (in parallel). The control is thus completely uncoordinated. Restrictions or specific characteristics of individual energy generators cannot be taken into account in the control of the energy supply system.

The control method according to the invention may combine a sequential control with a parallel control of energy generators. For this purpose, the energy generators are divided into groups, wherein a variable order of the energy generators is set within a group. Furthermore, an order of groups called a cascade may be defined, with a cascade comprising one or more groups.

A cascade is a level of classification of the energy generators superordinate to groups and determines a sequential order of switching on and/or off energy generators or groups of energy generators, respectively. Cascades are independently controllable. Thus, multiple sequential orders of energy generators executable in parallel may be defined, for each of which different criteria for switching on and/or off can be set. For each energy form, a unique classification and order of energy generators in groups and cascades may be defined.

In each group, a sequence (order) of energy generators is defined, wherein the sequence may be variable, for example, depending on controlled variables of the energy generator. Thus, for example, runtime equalization between several energy generators of a group may be realized. The order of switching on and/or off energy generators within a cascade may be determined depending on an order of the groups and the sequences within the groups.

Within each cascade, it may be decided autonomously whether and according to which criteria energy generators should be switched on and/or off in the order. Therefore, a variety of criteria may be set for each cascade which define, for example, thresholds depending on energy supply requests.

The cascades can be executed in parallel by the control device. As a result, the quality of control can be significantly improved compared to methods in which only a single linear sequence of energy generators can be defined. In addition, by executing cascades in parallel, it is possible to prevent the switching sequence from getting stuck on an energy generator in which a switching operation is prevented. The quality of control describes the behavior of a control. Here, a high (or good) quality of control means that a certain required target value can be achieved in a particularly short time. A low (or poor) quality of control means that a certain required target value will only be reached in a relatively long time.

In a preferred method, the control device determines target values for meeting the energy supply request for each energy generator based on the determined switch-on request(s) and/or switch-off request(s) and outputs the target values to the closed-loop controllers of the respective energy generator.

The control device may preferably detect, from each of the closed-loop controllers, restrictions with respect to the controlled variables of the respective energy generator, wherein the restrictions relate to minimum and/or maximum values of power provided by the energy generator and/or indicate whether the relevant energy generator must be switched on or off. Alternatively, the restrictions on the controlled variables of energy generators may also be specified in a different way than by a closed-loop controller, for example manually by a user.

These restrictions may be generator specific restrictions. As a restriction, for example, a minimum value and/or a maximum value may be specified. A minimum value and a maximum value may also be equal. In this way, an operating point can be set at which an energy generator is to be operated. Such an operating point can ensure, for example, a particularly high efficiency of the energy generator. By detecting the restrictions, it can be ensured that the control device takes into account specifications by the energy generators in a coordinated manner when determining the target values for meeting the energy supply requests. In particular, it can be avoided that the control device determines a target value for an energy generator which cannot meet this target value due to its own restrictions.

In addition, the control device may be configured to detect, from each of the closed-loop controllers, specific characteristics regarding a power output of the respective energy generator which indicate how an energy generator reacts to a change in the controlled variable. Alternatively, the specific characteristics regarding the power output of an energy generator may also be specified in other ways than by detecting from an closed-loop controller, for example manually by a user. Such specific characteristics may represent a characteristic curve of an energy generator, indicating, for example, what power the energy generator outputs when a particular actuating variable is set. The specific characteristics may relate, in particular, to dynamic properties of the energy generator. For example, they may describe how much time an energy generator needs to ramp up to full load (maximum power output) or how long it takes to switch off the energy generator (no power output).

A specific characteristic of an energy generator may also depend on a hydraulic connection of the energy generator in the energy supply system. It can thus be achieved that energy generators are controlled in accordance with their physical arrangement in the energy supply system. In this way, for example, the fulfillment of a request for providing a certain flow temperature may be simplified.

A specific characteristic of an energy generator according to the invention may also be the energy form(s) provided by it. In addition, the specific characteristic may be the energy carrier used by the energy generator and/or depend on the type of energy carrier used.

Preferably, the method may comprise a step of determining whether there is an energy supply request for more than one of the energy forms of heat, cold, or electrical energy. Then a classification of the cascades may be determined based on the energy form provided by the energy generators. The control of the energy generator is then carried out by the control device classification of the energy generators into cascades set in accordance with the energy forms.

The method may further comprise a step of determining whether there is more than one energy supply request for an energy generator. If there is more than one energy supply request for an energy generator, the controller may determine which energy supply request is to prioritize. The target values for the one energy generator are then determined based on the prioritized energy supply request. The prioritization of the energy supply requests may be done, for example, based on the demanded energy form.

The control device preferably comprises a device for detecting restrictions. The restrictions may relate to minimum and/or maximum values of power provided by an energy generator and/or indicate whether the respective energy generator must be switched on or off.

The control device may further comprise a coordinating unit which is configured to output switch-on and/or switch-off requests and/or target value specifications from the energy forms according to a prioritization of the energy forms to the target value output device. For this purpose, the coordinating unit may be configured to set a priority for each energy form so that each energy form receives a different priority. This may resolve conflicts in the presence of conflicting switch-on or switch-off requests to an energy generator. Then the switch-on or switch-off request is adopted which was generated by an energy form with higher priority.

According to the invention, the energy supply system may be configured to provide energy in the form of heat, cold and/or electrical energy. For each energy form, there may be at least one energy supply request. Energy supply requests for each energy form may be detected independently by the controller and further processed into corresponding target value requests to energy generators. For example, an energy supply request may come from a consumer, a plurality of consumers, or an external or internal device that coordinates requests from a plurality of consumers. For each energy form, it is also possible to define criteria for energy generators assigned to the corresponding energy form. Energy supply request for each energy form may be detected independently by the controller and further processed into corresponding target value specifications to energy generators.

Furthermore, there may be more than one energy supply request for an energy form. For this purpose, one or more energy forms may be categorized, for example, based on the connection of the energy generator and/or types of consumers present in the consumer circuits. This may serve, for example, to supply the (physical) energy form of heat to different consumer circuits with different requirements. Here, the energy generators affected by the energy supply request may also be connected to separate consumer circuits. Alternatively, it is possible to switch between different consumer circuits by means of valves, throttles and/or switches.

For the energy form of heat, for example, different energy supply requests may be present if different flow temperatures are requested for the hot water supply (drinking water) and heating and/or process heat (service water or steam).

The division into the energy forms heat, cold and electrical energy may also be supplemented by other energy forms (for example, mechanical energy). Furthermore, an energy form may also be subdivided into energy sub-forms depending on usage. For example, the energy form of heat may be subdivided into hot water, thermal heat and/or hot air. The energy form of cold may be subdivided, for example, into a building cooling system (for example, an air conditioning system with fresh air supply) and a device cooling system (for example, a coolant for cooling machines). Accordingly, a priority order may be established for energy sub-forms within one energy form and/or for all energy forms and energy sub-forms.

Since there may be energy generators in the energy supply system which can simultaneously provide more than one energy form, it may be necessary to determine under which conditions such energy generators should be switched on and/or regulated or controlled. The control device may prioritize certain energy forms in the control of the energy generator, so that an energy supply request or switch-on requests and/or switch-off requests for a first energy form are preferably treated over an energy supply request or switch-on requests and/or switch-off requests for a second energy form. The control device may also set or acquire a priority order for the energy forms. For example, the priority order may be set manually by a user. The control device may thus detect and process energy supply requests or switch-on requests and/or switch-off requests based on the priority of the respective energy form.

For example, a CHP supplies both heat and electrical energy (electrical current and/or electrical voltage). Consequently, two different requests from the two energy forms may be present for a CHP. However, since the electrical energy supplied by the CHP can be fed into a public power grid at any time in the absence of a corresponding request of the consumers supplied by the energy supply system, the CHP is usually used in continuous operation.

The energy form of heat includes all energy generators that can provide heat energy. In addition control device takes into account conditions for switching on and/or switching off for the energy form which are related to an energy supply request of heat, for example, a requested system flow temperature and/or a buffer temperature. Similarly, energy generators are assigned to the energy forms of electrical energy and cold.

Each energy generator in the energy supply system includes a closed-loop controller for controlling controlled variables of the energy generator. Controlled variables of an energy generator include, for example, a boiler temperature of the energy generator, a volume and/or mass flow of a carrier medium through the energy generator, a temperature of the carrier medium in the flow and/or the return flow of the energy generator, a power consumption of the energy generator and/or a power output of the energy generator. In an energy generator that provides electrical energy, the controlled variables may relate to an electrical current, an electrical power and/or an electrical voltage.

The closed-loop controllers are coordinated by a control device which is superordinate to the closed-loop controllers. The control device is configured to detect an energy supply request for energy in the form of heat and/or cold and/or electrical energy. An energy supply request may be, for example, a request to provide a certain flow temperature or a certain temperature in a buffer storage, in particular in a certain area of the buffer storage, or be an electric power. For example, the energy supply request may be generated by a consumer or a group of consumers and be output to the controller via an appropriate data communication link.

The controller may be further configured to determine, for each of the energy generators, target values for meeting the energy supply request depending on the particular energy carrier being used, the target values also including instructions for switching on or off an energy generator.

The control device is further configured to output the target values to the closed-loop controllers. For communicating with the closed-loop controllers, the control device uses a suitable data communication link.

The various energy carriers used in the energy supply system can put requirements on the energy supply system, for example due to different costs and/or fluctuating availability. In order to ensure an uninterrupted operation of the energy supply system if possible, the control device determines the target values for the energy generators, for example, based on the current and/or also precalculated, predetermined or estimated availability of the utilized energy currents.

For example, the control device may be configured to operate preferred energy generators which use, for example, particularly cost-effective and/or regenerative energy carriers at high or maximum power. Non-preferred energy generators which use, for example, less cost-effective and/or fossil energy carriers and which are provided to cover the peak loads should not be used to store heat in a buffer storage. Preferably, the preferred energy generators should be allowed to use the buffer storage to realize longer run times or fewer switching operations. The control device may also select non-preferred energy generators for loading a buffer storage.

Switching energy generators on and off by the controller in a purposeful manner alone would not be sufficient to meet the energy supply request, because the switching alone does not define at what modulation level or at what power level (or at what temperature level) the released energy generator is to operate. Therefore, target value specifications by the control device are required.

The different controlled variables of an energy supply system (for example, system flow temperature, buffer temperature, electrical current, electrical voltage) require that individual target value specifications are output to the individual energy generators. In addition, boundary conditions should also be taken into account. These boundary conditions may include, for example, control strategies, predetermined preferred energy generators and/or buffer dynamics.

The selective release of energy generators is not sufficient, for example, to control a system flow temperature and/or a buffer temperature to reach a desired level with a required power. This is because it is not defined by the release which power at which temperature level each approved energy generator should provide. Therefore, additional target value specifications are required. In an energy supply system, different energy generators with individual generator-specific restrictions (for example, minimum and maximum values of the power, the volume flow or the runtimes) may be represented. In addition, the extensive configuration options allow energy generators to work at different controlled variables (e.g., system flow temperature, buffer state of charge, electric current, electric voltage). These circumstances require that each energy generator receives individual target values in addition to the release or switch request.

Preferably, each closed-loop controller of each energy generator has an interface to receive target values from the control device. The closed-loop controllers act on the energy generator via suitable actuators in order to regulate the controlled variables to the corresponding desired value. The controlled variables include, for example: an (electric or heating or cooling) power that the energy generator introduces into the energy supply system, a volume or mass flow (or electric current) from the energy generator into the energy supply system, an energy generator flow temperature (an electric voltage).

The control device cannot act directly on these controlled variables, but merely outputs target values to a closed-loop controller of the energy generator. The regulation of the controlled variables to the nominal values remains the responsibility of the closed-loop controllers. Instead of a fixed target value, the control device may also specify an operating range (by an upper and lower restriction or a threshold value, respectively) to a closed-loop controller in which the controlled variables can be set by the closed-loop controller. An operating range defined by the control device may accordingly be defined by one or more target values which define minimum and/or maximum values for the controlled variables. Controlled variables are for example:

A maximum thermal or electrical power (or heating power, cooling power) of the energy generator which must not be exceeded. The requirement is, for example, a percentage in relation to the physically possible maximum power of the respective energy generator.

A minimum thermal or electrical power (or heating power, cooling power) of the energy generator which the power may not fall below. The requirement is, for example, a percentage in relation to the physically possible maximum power of the respective energy generator.

A maximum volume flow (or mass flow or electric current) of the energy generator flowing from or through the energy generator into the energy supply system. The requirement is, for example, a percentage in relation to the physically possible maximum flow of the respective energy generator.

A minimum volume flow (or mass flow or electric current) of the energy generator flowing from or through the energy generator into the energy supply system. The requirement is, for example, a percentage in relation to the physically possible maximum flow of the respective energy generator.

A minimum and/or maximum energy generator target temperature or electric voltage. The requirement is in degrees Celsius or Volt. The specific values that the control device sends to the closed-loop controllers of the energy generator are also referred to as target values below.

SHORT DESCRIPTION OF THE FIGURES

Further advantageous embodiments will be described in more detail below with reference to an embodiment shown in the drawings, to which the invention is not limited, however.

DETAILED DESCRIPTION OF EMBODIMENTS

Figure 1:
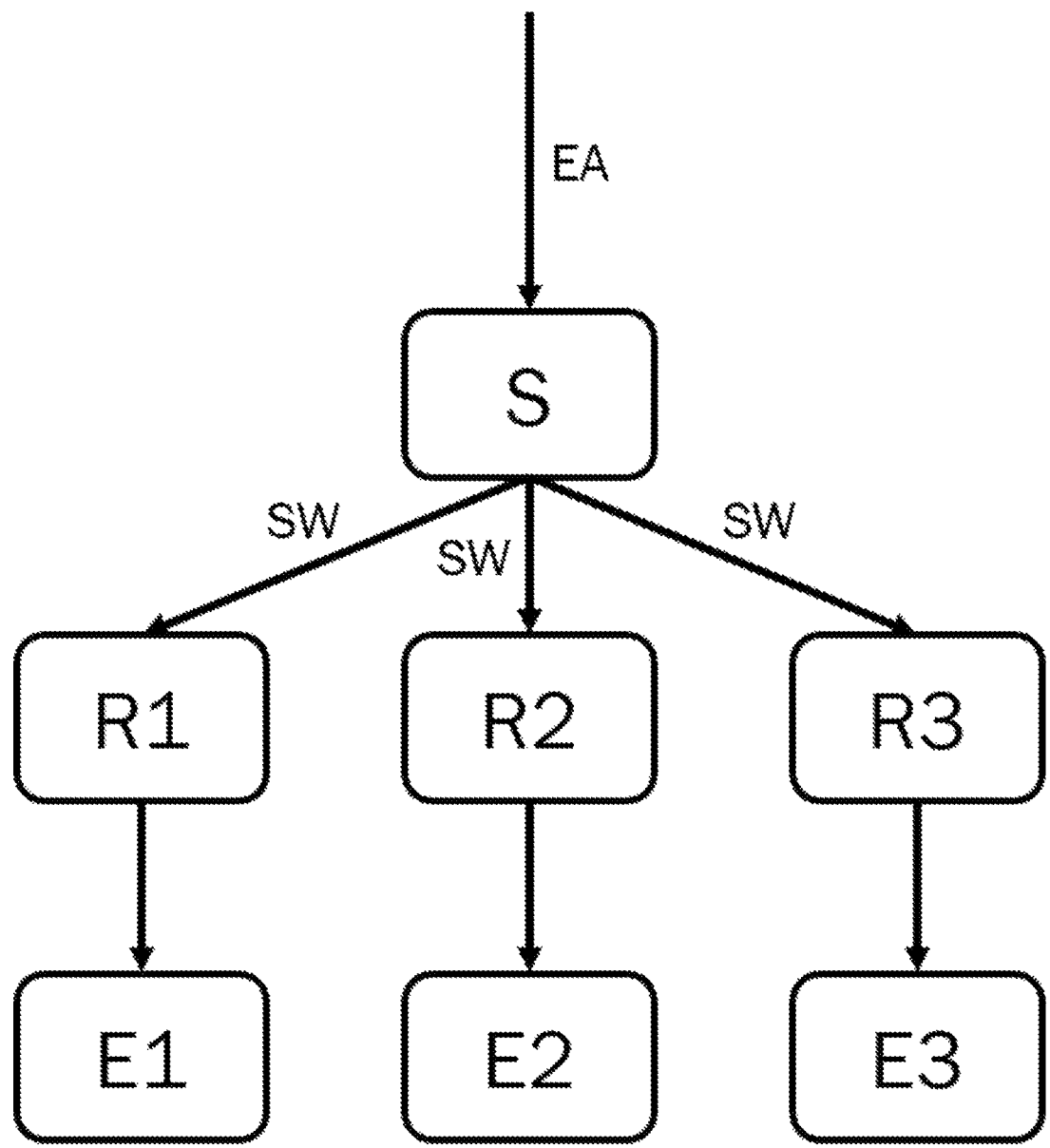
FIG. 1 shows a representation of control logic of an energy supply system according to a first embodiment.

In the following description of a preferred embodiment of the present invention, like reference characters designate like or similar components.

First Embodiment

FIG. 1 shows a schematic structure of a control device S for controlling an energy supply system according to a first embodiment. The energy supply system is preferably a multivalent energy supply system, the energy generators E1-E3 of which use a total of at least two different energy carriers. The energy supply system shown in FIG. 1 includes three energy generators E1-E3 which provide energy in the form of heat F1 and/or cold F3 and/or electrical energy F2.

The energy supply system has a control device S which is configured to detect at least one energy supply request EA for providing energy in the form of heat F1 and/or cold F3 and/or electrical energy F2. For example, the at least one energy supply request EA may be generated by a plurality of consumers (not shown), manually dictated by a user, or generated by a higher level device communicating with the control device. The control device S determines target values for the plurality of energy generators E1-E3 of the energy supply system based on the at least one energy supply request EA and outputs the target values SW to closed-loop controllers R1-R3 of the energy generators E1-E3.

Even if the exemplary embodiment of the energy supply system illustrated in FIG. 1 comprises three energy generators E1-E3, the invention is not limited to the fact that the energy supply system includes only three energy generators E1-E3. Rather, an arbitrarily high number of energy generators may be controlled by a control device S according to the invention or using one of the methods according to the invention.

The control device S is configured to determine, for each energy form F1-F3 which energy generators E1-E3 are required to meet the at least one energy supply request EA. The determination may be made based on the amount of energy requested by the at least one energy supply request EA and the power that can be provided by the energy generators E1-E3.

For each energy form F1-F3, the control device S generates switch-on requests ON for the energy generators E1-E3 required to meet the at least one energy supply request EA. Furthermore, for each energy form F1-F3, the control device S generates switch-off requests OFF for the energy generators E1-E3 not required to meet the at least one energy supply request EA.

For each energy generator E1-E3, the control device S determines if there are one, several or no switch-on requests ON present and if there are one, several or no switch-off requests OFF present.

In a first operating mode "ON before OFF", the control device S outputs, for each energy generator E1-E3 for which there is at least one switch-on request ON, a switch-on request ON to the corresponding closed-loop controller R1-R3. For each energy generator E1-E3 for which there is no switch-on request ON and at least one switch-off request OFF, the control device S outputs a switch-off request OFF to the corresponding closed-loop controller R1-R3.

In a second operating mode "OFF before ON", the control device S outputs a switch-off request OFF to the corresponding closed-loop controller R1-R3 for each energy generator E1-E3 for which there is at least one switch-off request OFF. For each energy generator E1-E3 for which there is no switch-off request OFF and at least one switch-on request ON, the control device S outputs a switch-on request ON to the corresponding closed-loop controller R1-R3.

In a third operating mode, the control device S sets a priority for each energy form F1-F3, so that each energy form F1-F3 receives a different priority. For example, heat F1 may receive the highest, electric current F2 a medium and cold F3 the lowest priority. For each energy generator E1-E3 for which there is at least one switch-on request ON and at least one switch-off request OFF of different energy forms F1-F3, respectively, the switch-on or switch-off request of the energy form with the highest priority is determined. The control device S outputs the switch-on request ON or switch-off request OFF which was generated by the energy form F1-F3 with higher priority to the corresponding closed-loop controller R1-R3.

For example, when, for an energy generator E1 which is a combined heat and power plant (CHP) capable of providing both heat F1 and electric current F2, an electric current F2 switch-on request ON and a heat F1 switch-off request OFF are present, a switch-off request OFF is output to the closed-loop controller R1 according to the exemplary priority classification.

Furthermore, the control device S is configured to determine, for each energy generator E1-E3, target values SW for meeting the at least one energy supply request EA based on the identified switch-on request(s) ON and/or switch-off request(s) OFF and to output the target values SW to the closed-loop controllers R1-R3.

If the control device S detects energy supply requests EA for the simultaneous provision of heat F1 and electric current F2, the control device S may identify a first energy generator configured to simultaneously provide the first energy form heat F1 and the second energy form electric current F2, for example the aforementioned CHP E1.

For example, for the CHP E1 there are both a switch-off request OFF from the first energy form heat F1 and a switch-on request ON from the second energy form electric current F2 present. Furthermore, the control device S determines that for a second energy generator E2 which is configured to provide heat F1, for example a gas boiler E2, there is a switch-on request ON of the first energy form F1 present.

In this case, the control device S recognizes that the CHP E1 can meet the energy supply request EA for both heat F1 and electric current F2 and is already switched on for providing electrical current. Switching on the gas boiler E2 can be avoided here. Therefore, the control device S generates a switch-on request ON of the first energy form heat F1 for the CHP E1 and a switch-off request OFF of the first energy form heat F1 for the gas boiler E2 and outputs these switch requests to the corresponding closed-loop controllers R1-R2. The CHP E1 then provides the requested energy in the form of heat F1 and electric current F2. The gas boiler E2 does not even have to be switched on.

The control device S preferably executes the control method according to the invention periodically at predetermined discrete points in time k. In accordance with a fourth operating mode, the control device determines a first energy generator E1 which is configured to simultaneously provide a first energy form of heat F1 and a second energy form of electric current F2. This may again be the CHP E1 of the example described above. For the CHP E1, a switch-on request ON of the second energy form of electric current F2 and a switch-off request OFF of the first energy form of heat F1 were present at a previous time k-1. Due to the switch-on request ON of the second energy form F2, the CHP E1 was in operation. With regard to the first energy form F1, the CHP E1 had the status "externally requested". External requests of energy generators will be described in more detail in conjunction with the sixth embodiment. At the present time k, the control device has generated a switch-off request OFF to the CHP E1 for the second energy form F2. If, in addition, there is also a switch-off request OFF of the first energy form heat F1, then the CHP E1 would be switched off, since now a switch-off request OUT would be present for both energy forms heat F1 and electric current F2 the CHP unit E1 can provide.

If, however, at the control device S, there is an energy supply request EA for providing the first energy form heat F1 at the present time k, then the control device S may recognize that it is advantageous to generate a switch-on request ON for the CHP E1 for the energy form F1. The CHP E1 is in fact already in operation because of a previously generated switch-on request ON of the energy form F2 and does not have to be switched on first. A switching operation for the CHP E1 could therefore be avoided. This adoption of the CHP E1 of the energy form heat F1 may in particular also occur if would not have been the turn of the CHP E1 in a switching order of the energy form heat F1, but the turn of a second energy generator, for example the gas boiler E2. Therefore, switching off the CHP E1 and switching on the gas boiler E2 can be avoided.

The above-described generation of the switch-on request ON of the first energy form heat F1 for the CHP E1 may also be performed based on a so-called switch-on indicator. A switch-on indicator for the energy generator E1 is a further energy generator E2-E3 which is also given a switch-on request ON for the same energy form. In the present example, this may be the gas boiler E2 which may also provide heat F1. When the gas boiler E2 has had a turn-off request OFF of the first power form heat F1 at the previous time k-1 and a power-on request ON of the first power form heat F1 is issued at the present time k, the switch-on request ON is transferred to the CHP E1 as described above. The generated switch-on request ON to the gas boiler E2 is an indicator that more heat F1 is to be provided. Therefore, the gas boiler E2 is referred to here as a switch-on indicator for the CHP E1.

For each energy form F1-F3, the control device S may detect or also determine itself an order of switching on and/or switching off the energy generators E1-E3, respectively. Then, determining the switch-on requests ON and/or switch-off requests OFF takes place based on the order. As described above, however, the control device S may also decide that energy generators E1-E3 are skipped in the order if a switching operation can thereby be avoided.

Second Embodiment

Figure 2:
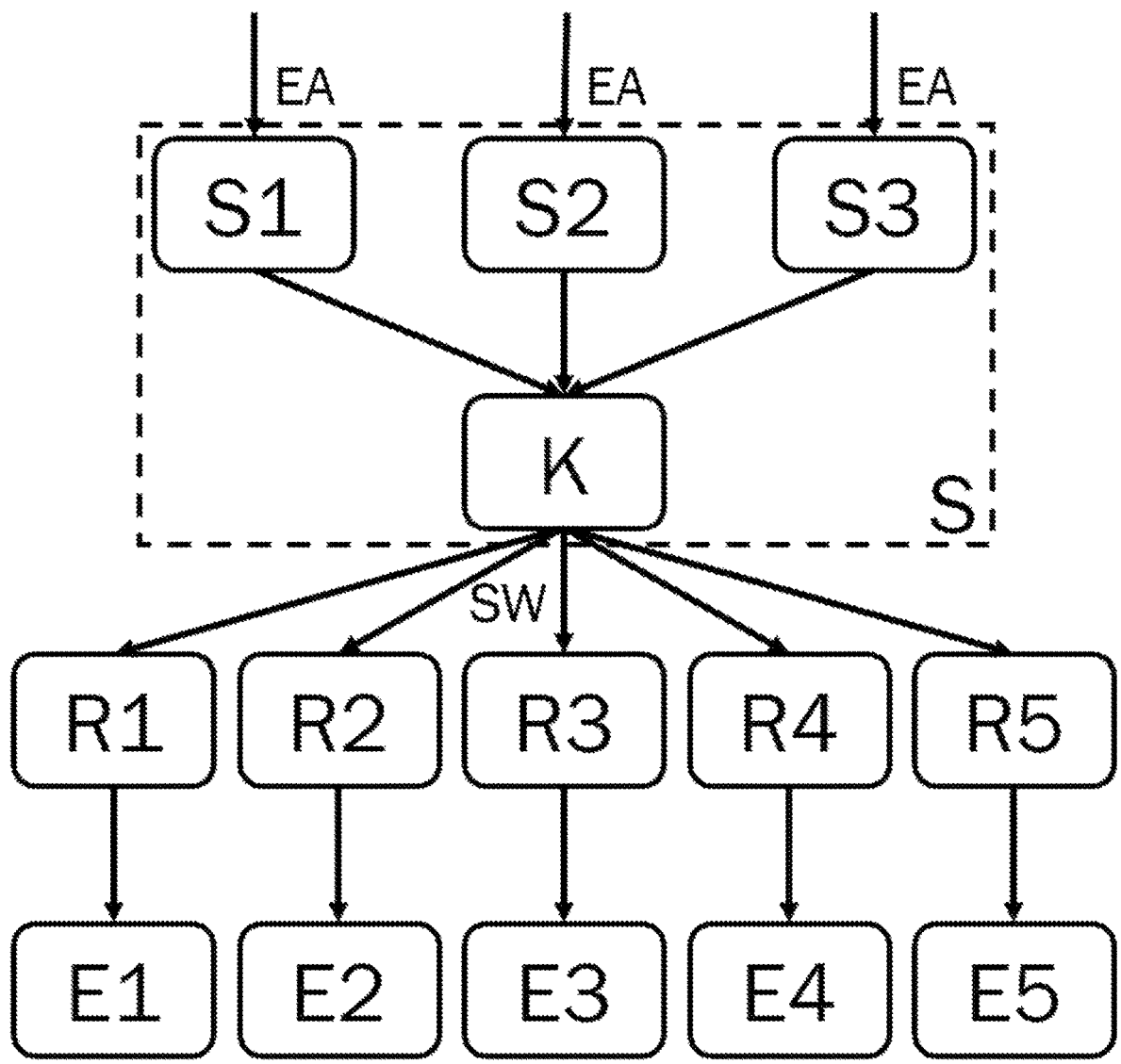
FIG. 2 shows an illustration of control logic of an energy supply system including five energy generators for three energy forms according to a second embodiment.

FIG. 2 shows a second exemplary embodiment of an energy supply system having five energy generators E1-E5. Only differences of the second embodiment from the first embodiment will be described in more detail below. Here, the control device S comprises three control units S1-S3 and a coordinating unit K. The control units S1-S3 respectively detect an energy supply request EA for each energy form F1-F3.

For example, the first control unit S1 may detect an energy supply request EA in the form of a heat request, the second control unit S2 may detect an energy supply request EA in the form of a request for electrical energy, and the third control unit S3 may detect an energy supply request EA in the form of a request for cold. Since there may be energy generators E1-E5 in the energy supply system that provide more than one energy form F1-F2 such as a combined heat and power plant that provides electrical energy F2 and heat F1, the control device S may detect energy supply requests EA for different energy forms F1-F3 related to the same energy generator E1-E5.

The coordinating unit K is configured to check the energy supply requests EA and the target values determined by the three control units S1-S3 for conflicts and to coordinate the use of the energy generators E1-E5 accordingly. For this purpose, the individual energy forms F1-F3 may be given different priorities, for example. In an energy supply system with one or more CHPs, it would be useful, for example, to prioritize requests for providing electrical energy F2, so that the CHPs are not switched off when there is no request to provide heat F1 (temporarily) and therefore a switch-off request for heat F1 is generated.

The coordinating unit K is configured to control the interaction between the different energy forms F1-F3. The energy generators E1-E5 which provide a plurality of energy forms F1-F3 and receive a switch-on request related to a first energy form F1-F3, for example, current F2, may not be turned off, for example, due to energy supply requests EA for a second energy form F1-F3, for example heat F1, or a third energy form F1-F3, for example cold F3. For this purpose, the coordinating unit K assigns priorities to the energy forms. The order of priority may be fixed or variable.

For example, the energy form F1-F3 which first issues a request to switch on to an energy generator E1-E5 may receive the highest priority. The energy form F1-F3 may keep the highest priority as long as its request exists. If, in a calculation step k, several energy forms F1-F3 issue a switching request to an energy generator E1-E5, the priority may also be determined according to a predetermined priority sequence.

The coordinating unit K may also take into account that as few switching operations as possible should take place. In particular, the coordinating unit K also takes of generator-specific specifications into account, since there are energy generators E1-E5 which may not be switched for a certain period after being switched on or off. Other energy generators E1-E5 may be switched on and off virtually indefinitely.

Third Embodiment

Figure 3:
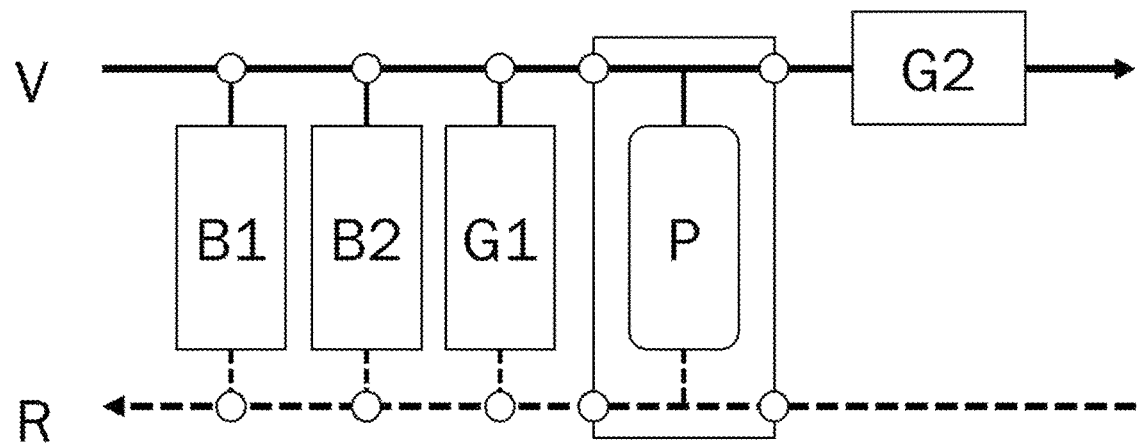
FIG. 3 is a hydraulic diagram of an energy supply system according to a third embodiment including two CHPs, a buffer storage and two gas boilers.

FIG. 3 shows a schematic illustration of a third exemplary embodiment of an energy supply system for providing heat F1 and electrical energy F2. FIG. 3 shows a hydraulic diagram (a schematic representation of the infrastructure) of the energy supply system for the heat supply, in which heat is released to a fluid carrier medium, for example water. The carrier medium transports the heat via a flow V to at least one consumer circuit (not shown). The flow V is shown as a solid arrow which illustrates the flow direction of the carrier medium to the consumer circuit. In the consumer cycle, a plurality of consumers, for example a plurality of radiators, may be arranged.

Via a return flow R, the carrier medium flows back from the consumer circuit to the energy supply system. The return flow R is shown as a dashed arrow which illustrates the flow direction of the carrier medium. The carrier medium can be caused to flow, for example, by means of circulating pumps which may be arranged in the generator circuit, for example in the energy generators B1-B2, G1-G2 and/or in the consumer circuit. In addition, valves and/or throttles and/or sensors for measuring the flow and/or the temperature may be arranged in the energy generators B1-B2, G1-G2 and/or in the flow V and/or in the return flow R in order to control or regulate a flow through the energy generators B1-B2, G1-G2.

The energy supply system includes two combined heat and power plants (CHPs) B1-B2 and two gas boilers G1-G2, wherein the two CHPs B1-B2 are arranged in parallel to each other between the flow V and return flow R. Via the return flow R, the carrier medium coming from the consumers flows to the energy generators which supply heat to the carrier medium. Via the flow V, the carrier medium flows to the consumer circuit. The CHPs B1-B2 are configured to provide energy in the form of heat F1 and electric current F2. The two gas boilers G1-G2 are configured to provide energy in the form of heat F1.

A first gas boiler G1 is also arranged in parallel to the CHPs B1-B2 and downstream thereof at the flow V. The first gas boiler G1 is, for example, a condensing boiler with high efficiency. Further downstream in the flow V, a buffer storage P is arranged in parallel to the first gas boiler G1 and the CHPs B1-B2. Further downstream of the buffer storage P, a second gas boiler G2 is arranged in series in the flow V, so that the second gas boiler G2 may raise the flow temperature directly. Due to the arrangement of the second gas boiler G2 behind the buffer storage in the flow, it cannot influence the temperature of the water stored in the buffer storage. The second gas boiler G2 is, in particular, a gas boiler which can still operate even if the temperature of the carrier medium is already relatively high.

Although not explicitly illustrated in FIG. 3, the CHP units B1-B2 and the gas boilers G1-G2 each have a closed-loop controller R1-R4 for controlling controlled variables of the energy generators B1-B2, G1-G2. A control device S is connected to the closed-loop controllers R1-R4 and may periodically retrieve the set controlled variables from the closed-loop controllers R1-R4 at predetermined discrete times k and/or output target values SW as well as switch-on requests ON and switch-off requests OFF to the closed-loop controllers R1-R4. The energy supply system may thus be similar to that shown in FIG. 1, but with four energy generators B1-B2, G1-G2. The control device S may receive energy supply requests EA, i.e., requests for the provision of electrical energy F2 and/or heat F1, for example from the consumer circuit or a superordinate consumption control. The control device S controls the energy generators B1-B2, G1-G2 via the closed-loop controllers R1-R4 to meet the required demand for energy.

The energy supply system of the present example is to be operated according to the following task: the CHPs B1-B2 should preferably be used such that, in addition to heat F1, electrical energy F2 can be provided at all times. In addition, the operation of CHPs are made particularly reliable by providing long and continuous runtimes and the energy generators B1-B2, G1-G2 can be preserved by avoiding switching operations.

The first gas boiler G1 should only be used when both CHPs B1-B2 are already in operation and the heat provided by them in the flow V is insufficient to meet an energy supply request EA, for example in the form of a required temperature in the buffer storage P or a system flow temperature at the junction to the consumer circuit (on the far right in FIG. 3). Alternatively, the gas boiler G1 may be switched on even if only one of the two CHPs B1-B2 is already in operation in order to be able to react particularly quickly to a temporarily increased heat demand.

The second gas boiler G2 should only be switched on when both CHPs B1-B2 and the first gas boiler G1 are already in operation and the heat provided is insufficient to provide a requested flow temperature. The order of switching on the gas boilers G1 and G2 should be fixed since the gas boiler G1 is a condensing boiler with a high efficiency. The CHPs B1 and B2 should also be able to be switched on in the presence of an energy supply request EA for electrical energy. In addition, runtime equalization between the two CHPs B1-B2 should take place.

Figure 4:
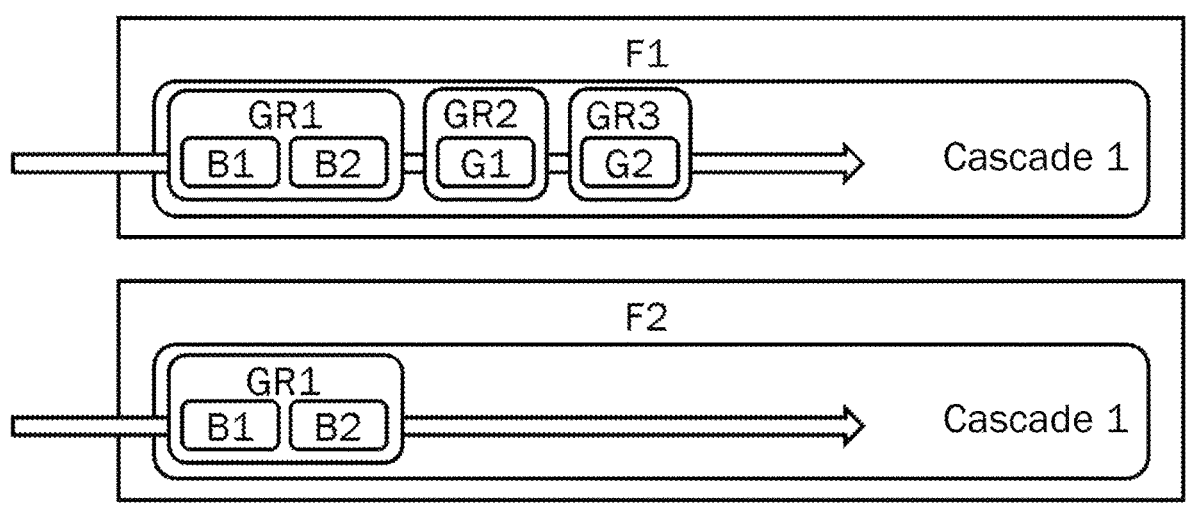
FIG. 4 shows a classification of the energy generators of the third embodiment into energy forms, cascades and groups.

With reference to FIG. 4, it will now be explained how an order of switching on or off the energy generator of the energy supply system can be determined. Since the energy supply system may provide both heat F1 and electric energy F2, the control of the energy supply system is divided into two energy forms F1 (for heat) and F2 (for electric energy).

As mentioned above, a requirement for the control is that runtime equalization between the CHPs B1-B2 should take place. In order for the CHPs to be used first, a fixed sequence of switching on and/or off with the CHPs B1-B2 at the first two positions would have to be defined in a control according to the prior art. However, with a fixed sequence of switching on and/or off no runtime equalization could be realized. The first CHP B1 would get significantly more operating hours than the second CHP B2 in a conventional control. If, alternatively, runtime equalization over all four heat generators B1-B2, G1-G2 would take place, the two gas boilers G1-G2 would end up with identical or similar runtimes to the CHPs B1-B2, whereby the requirement for the preferred use of the CHPs B1-B2 could not be fulfilled.

In order to realize the runtime equalization, the two CHPs B1-B2 are assigned to a first group GR1. Within group GR1, CHP units B1-B2 may exchange their positions. One criterion for determining at which position a CHP in the group should be arranged may be the runtime difference between the CHPs B1-B2. In order to prevent constant switching of the positions of the two CHPs B1-B2 within the group GR1, in addition, a minimum runtime difference may be set, from which a switch of positions is to be performed. The control device detects the runtimes of the CHPs B1-B2 and defines the order of the CHPs B1-B2 based on the detected runtimes.

Position-specific criteria are criteria for switching on or off energy generators that are fixed to their respective position in a group and do not switch with the energy generators when switching positions within the group. A position-specific criterion may, for example, be specifications as to how an energy generator should be switched on or off temporally. These specifications may be, for example, a switch-on integral and/or a switch-off integral. Another example of a position criterion usage is switching off an energy generator based on a buffer temperature.

Via the use of position criteria for switching on or off energy generators, a behavior of the energy supply system can be defined which is independent of the energy generator currently arranged in the respective position. Thus, for example, threshold values may be defined, and in the case of exceeding or falling below a threshold value a particular predetermined switching behavior is carried out. Thus, it may be determined, for example, for each point in the order of the energy generators, if the energy generator is to be switched off or switched on at the respective position when the threshold value is exceeded or underrun. It is thus possible to set the behavior of an energy supply system with a possibly unknown configuration in advance within certain limits regardless of the energy generators actually used later on.

As already mentioned, the order in which the first gas boiler G1 and the second gas boiler G2 are switched on should be fixed. Runtime equalization between the gas boilers G1-G2 should not take place. To achieve this, the two gas boilers G1-G2 are assigned to two separate groups GR2, GR3.

The three groups GR1-GR3 of the first energy form F1 may be assigned to a common cascade 1. A cascade is thus a level of the classification of the energy generators superordinate to groups. The order of the groups GR1-GR3 is usually fixed and is not changed by the control device S. However, it may also be contemplated that the order of the groups changes under certain circumstances. In order for the CHPs B1-B2 to reach as many operating hours as possible, the group GR1 is placed first in the cascade 1. Since the gas boiler G1 should preferably be operated, the group GR2 is placed second. In the present embodiment, the order of the group is thus determined.

In this example, the CHPs B1-B2 may be operated to provide heat as follows: the first CHP B1 in the first place within the group GR1 (depending on runtime equalization, this may be the second CHP B2) is switched on if a system flow temperature falls below a required system flow temperature. Here, the required system flow temperature is measured downstream of the second gas boiler G2 in the flow V. When a predetermined threshold value of the temperature in the buffer storage P which is measured in a layer located at the bottom in the buffer storage P is exceeded, the first CHP B1 is switched off.

The control of the second CHP B2 in the second position in group GR1 is performed in a similar manner as that of the first CHP B1. If, in spite of the CHP B1 being activated, an undershooting of the required system flow temperature is detected, the control device S switches on the second CHP B2. When a predetermined threshold value of the temperature in the buffer storage P which is measured, for example, in a layer located in the center of the buffer storage P is exceeded, the control device S switches off the second CHP B2 again.

When the CHPs B1 and B2 are already switched on, the gas boiler G1 is switched on when system flow temperature falls below the required system flow temperature. Switching off the gas boiler G1 takes place when a threshold value of the temperature in the buffer storage P which is measured in an upper layer is exceeded.

If the first three energy generators in cascade 1 of the energy form heat F1 are already in operation, but a system flow temperature below the required system flow temperature is measured, the second gas boiler G2 is switched on. As soon as the required system flow temperature is exceeded, the control device S switches off the gas boiler G2 again.

The switching criteria described here with regard to exceeding and undershooting flow and buffer temperatures are examples of position criteria which apply regardless of which energy generator is assigned to the relevant position at the respective time.

In addition to the energy supply requests EA for heat F1, the control device S also receives energy supply requests EA for electrical energy F2 or electrical power (for example in the form of a current request or a voltage request). The CHPs B1-B2 may therefore be switched or regulated based on an energy supply request EA for electrical energy F2 in addition to an energy supply request EA for heat F1. Therefore, the CHPs B1-B2 are assigned to a second energy form F2 for electrical energy. Energy supply requests EA for electrical energy F2 and/or switching requests (ON/OFF) to energy generators that provide electrical energy F1 are generated or taken into account by the control device S.

The CHPs B1-B2 may thus be used to meet energy supply requests EA of two energy forms F1-F2. Here, it may happen that conflicting requests are received (or generated) by the control device S. Thus it may happen that the energy form heat F1 requests that both CHP units B1-B2 are switched off, since, for example, the buffer storage P has reached its maximum temperature. On the other hand, the energy form electrical energy F2 continues to request the operation of the first CHP. The control device S must therefore decide which request from which energy form F1-F2 should be treated as a priority.

In particular, the energy supply requests EA for heat F1 and for electrical energy F2 are processed in a coordinated manner by the control device S. This corresponds to finding a compromise between the energy supply request for heat F1 and the energy supply request for electric energy F2. For example, if the energy form heat F1 requests switching off a CHP B1-B2, the control device S first checks whether the operation of the CHP B1-B2 is still required in order to meet an energy supply request for electrical energy F1-F2 before the relevant CHP B1-B2 is switched off.

A possible switching strategy envisages that a switch-on request ON is always treated as a priority ("ON before OFF"). Accordingly, an energy generator always remains on when at least one energy form F1-F3 requests the relevant energy generator. The energy generator is only switched off when no energy form F1-F3 requests the operation of the energy generator. Alternative strategies may envisage that a switch-off request OFF is always treated as a priority ("OFF before ON") or a prioritization of the energy forms F1-F3 is defined such that the control device S always treats a switching request ON/OFF of a certain energy form F1-F3 preferentially, In the following, a modification of the third embodiment is described, in which the following tasks are to be fulfilled: requests for electrical energy F2 are to be covered by the CHPs B1-B2. Furthermore, current locks given by the consumers have to be considered in the operation of the CHP units B1-B2. Here, a current lock relates to a requirement that no electrical energy may be fed from the energy supply system into the local network. For current locks, therefore, a heat demand must be provided solely by the gas boilers G1-G2.

If there is a need for electrical energy and for heat at the same time, the CHPs B1-B2 should preferably be used. As a result, the operation of the energy supply system may be particularly reliable. As long as there is no current locking, the CHPs B1-B2 are used for the provision of heat, with the CHP units B1-B2 being able to be used particularly efficiently while simultaneously supplying electrical energy.

The number of switch-on and switch-off operations of the CHP units B1-B2 due to changing requests for electrical energy F2 and/or heat F1 should be reduced as far as possible. Thereby, the CHPs B1-B2 are to be preserved and a particularly uninterrupted and reliable continuous operation is to be achieved.

In the prior art, two modes of operation are known for meeting the above requirements. In a first mode of operation, requests for providing electrical energy act directly on the CHPs B1-B2 and are thus automatically prioritized higher than requests for providing heat. This mode of operation may result in severely limited quality of control.

In an alternative second mode of operation, the control device only considers requests for providing heat. Here, the electrical energy generated by the CHPs B1-B2 is only a by-product and accordingly cannot be adapted to the demand. Current locks are ignored in this mode of operation.

In both modes of operation described above requests for the provision of electrical energy and heat cannot be considered simultaneously in the control of the energy supply system, although the energy supply system would be technically suitable, since the energy generators can each be controlled in their power output. Both modes of operation also have the disadvantage that changes in requests can lead to unnecessary switching operations of energy generators. This is illustrated by the following example according to the first mode of operation:

In the initial state, a CHP is in operation due to a request to provide electrical energy. The resulting heat can cover the heat demand. If the demand for electrical energy ceases, the CHP is switched off. This reduces the amount of heat provided which leads to a shortage of heat, so that after a short time, the CHP is switched on again, this time for the purpose of heat supply. This (additional) switch-on and switch-off operations lead both to a deteriorated quality of control in the provision of heat and to a reduced durability and reliability of the energy supply system.

Fourth Embodiment

Figure 5:
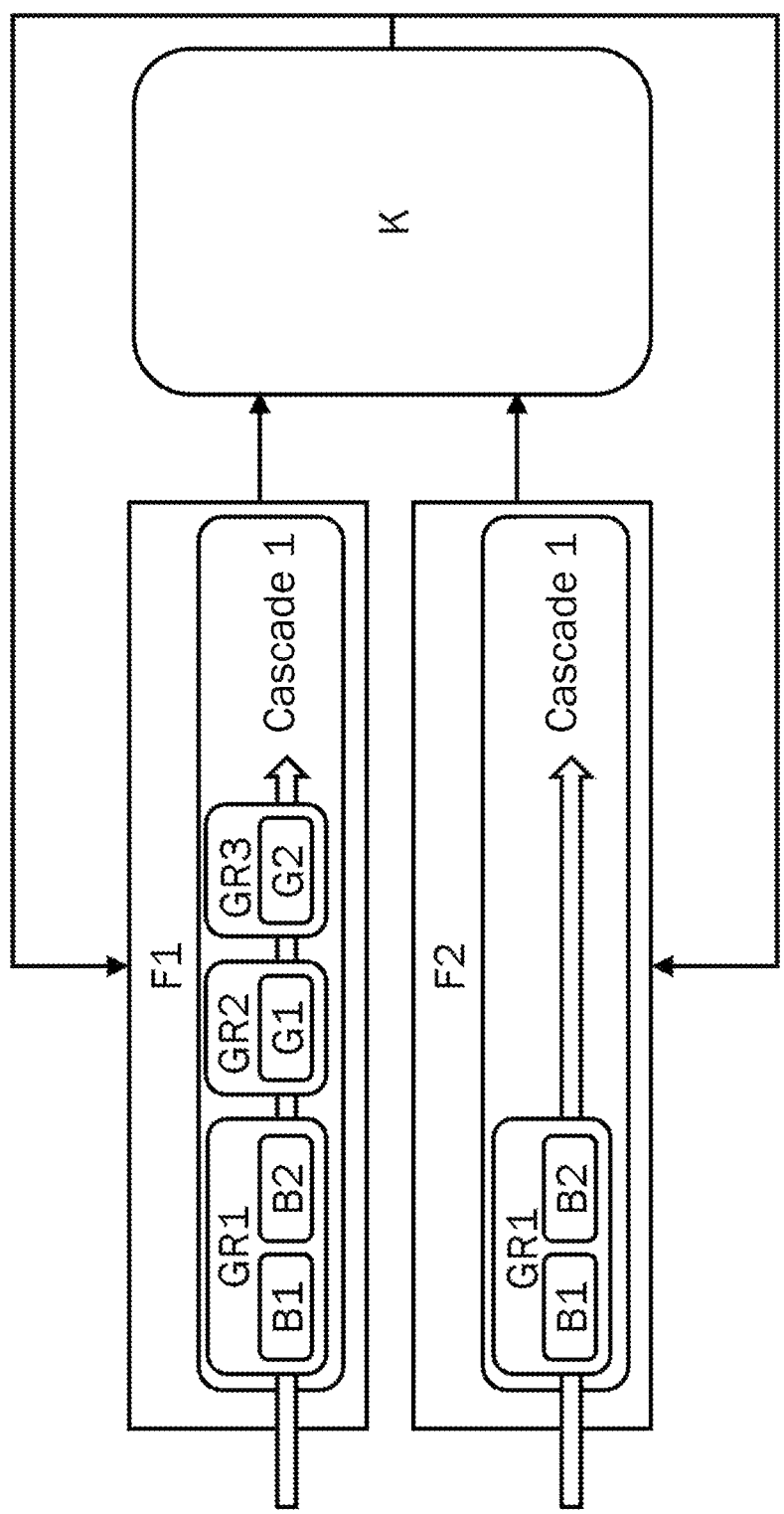
FIG. 5 shows a fourth embodiment which is a modification of the classification of the energy generators of the third embodiment into energy forms, cascades and groups of the third embodiment.

The control of the energy supply system of the third embodiment according to the invention which takes into account energy supply requests EA for more than one energy form F1-F2 will be described below with reference to FIG. 5. FIG. 5 shows a fourth exemplary embodiment, in which the control device S comprises, as a further component, a coordinating unit K configured to coordinate energy supply requests EA for heat F1 and electrical energy F2. Herein, the control device S comprise a dedicated control unit S1-S2 for each energy form F1-F2, as described in the second exemplary embodiment and shown in FIG. 2, wherein the coordinating unit K compares and coordinates the target values SW generated by the control units S1-S2 before outputting them to the respective closed-loop controllers R1-R4. As shown in FIG. 5, a result of the coordination by the coordinating unit K is fed back to the energy forms F1-F2 and the corresponding control units S1-S2, respectively. Coordination means, in particular, that conflicts between switch-on and switch-off requests from different energy forms F1-F2 are solved and that avoidable switching operations are identified.

The method executed by the control unit S with the coordinating unit K may, for example, proceed as follows: the control unit S checks whether the CHP B1 which is operated due to an energy supply request EA for providing electrical energy F2, would be sufficient to meet an energy supply request EA for providing heat F1. For this purpose, the control device S performs an estimation of the power required to meet the energy supply request EA for providing heat F1. If the previously detected energy supply request EA for providing electrical energy F2 is eliminated—i.e., if a switch-off request OFF for the energy form F2 is generated (in particular by the control device S itself), then the coordinating unit K can decide to continue to operate the CHP B1 for supplying heat F1 (adopting the CHP B1 by the energy form F1). For this purpose, the control device S generates a switch-on request ON for the energy form heat F1. The transition of the switch-on request ON of the energy form electrical energy F2 to the energy form heat F1 is also referred to as external adoption.

Due to the distortion-free change of the switch-on request ON for providing electrical energy F2 to the switch-on request ON for providing heat F1, the CHP unit B1 remains switched on continuously and now continues to supply the heat which is required to maintain the heat demand. As a result, a switching operation of switching CHP B1 off and on again can be avoided. The quality of control for the provision of heat consistently remains high and the durability of the CHP B1 can be improved.

By examining the possibility of adapting a switch-on request ON to an energy generator from one energy form to another, the controlled operation of the energy supply system (for a first energy form F1, a switch-on request ON is detected, changes to a switch request to provide a further energy form F2 are accepted as perturbational influences) a controlled operation of the system. Via the coordinating unit K, the calculated switch requests ON/OFF are returned to the respective other energy form, so that changes in the switching requests can be taken into account directly and in a coordinated manner.

Fifth Embodiment

Figure 6:
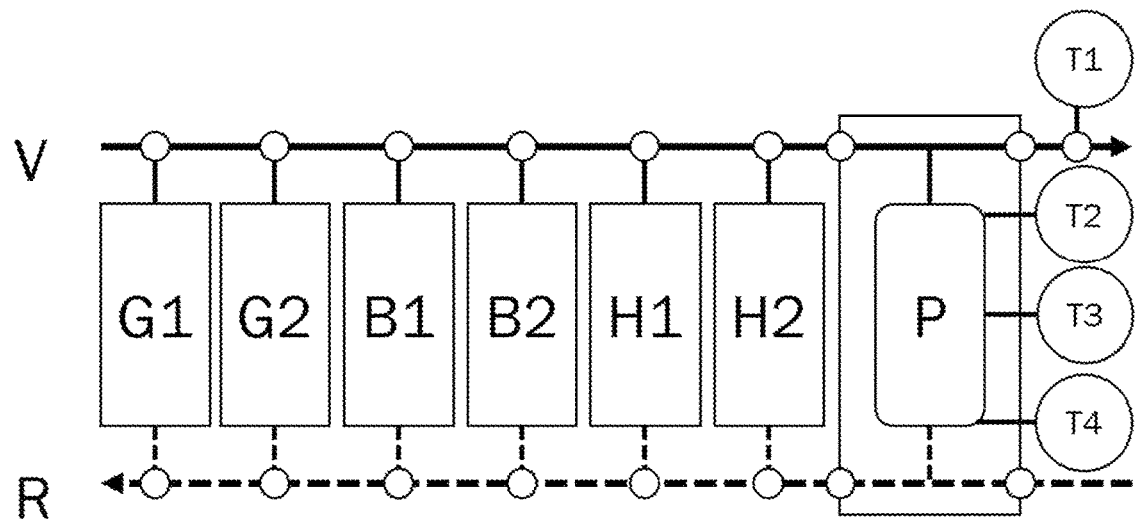
FIG. 6 is a hydraulic diagram of an energy supply system according to a seventh embodiment including two gas boilers, two CHPs, a buffer storage and two wood boilers.

FIG. 6 shows a hydraulic diagram of an energy supply system according to a fifth exemplary embodiment. The energy supply system comprises two gas boilers G1-G2, two CHPs B1-B2 as well as two wood boilers H1-H2 and a buffer tank P. In addition, a temperature sensor T1 is arranged in the flow V which measures the system flow temperature. In the buffer storage P, three temperature sensors T2-T4 are arranged which respectively measure the temperature in the buffer storage P in an upper area, in a center area and in a lower area of the buffer storage. The temperature sensors T1-T4 output their measuring signals to a control device S.

The control of the energy supply system is performed based on a detected energy supply request EA which determines, for example, a required system flow temperature, for example at the measuring point T1, or a buffer storage temperature at one of the three measuring points T2-T4 of the buffer storage P. Depending on a deviation of the values measured at the measuring points T1-T4, the control device S may then determine target values SW for the energy generators B1-B2, G1-G2, H1-H2 from the specifications of the energy supply request EA and output them to the corresponding closed-loop controllers.

The two wood boilers H1-H2 are assigned to a group GR1 together. As described above, in the group, runtime equalization between the wood boilers H1-H2 may take place. Correspondingly, the two CHPs B1-B2 are assigned to the group GR2 and likewise operated with runtime equalization. The two gas boilers G1 and G2 are assigned to the group GR3. Between the gas boilers G1-G2 a runtime equalization may also take place. This classification of the energy generators into groups is performed within the energy form heat F1. The two CHP units B1-B2 are also divided into groups (or a group) within the energy form of electrical energy F2.

The wood boilers H1-H2 and CHPs B1-B2 are considered to be the preferred energy generators since their operation has economic advantages over gas boilers G1-G2. The groups GR1 and GR2 are assigned to a first cascade 1 for this reason. The order of the groups GR1 and GR2 within the group may be based on group-specific criteria. For example, the order may be determined according to current fuel costs or the availability of energy carriers used, depending on planned maintenance actions or on an energy supply request for electrical energy F2. In addition, generator-specific criteria may influence the order of the groups GR1, GR2 in the cascade 1.

A specification to the control device S may be that a large amount of energy should be stored in the buffer storage P. Here, for the buffer temperature control, a buffer temperature sensor T4 at a lower portion of the buffer storage P is selected. The buffer target temperature is set to, for example, 70° C. The control device S then ensures that the buffer storage P is completely charged to a temperature of 70° C.

If the buffer storage P is to be loaded only approximately halfway, a buffer temperature sensor T3 in a center area of the buffer storage P is selected for the buffer temperature control.

When no buffer storage is desired, a buffer temperature sensor T2 at an upper portion of the buffer storage P is selected for the buffer temperature control. It is not necessary to set a buffer target temperature, since an energy generator flow target temperature may be calculated from a system target flow temperature. Only as much energy as is consumed by the consumers is generated, and the buffer P is not charged in this case. The system flow temperature may be measured, for example, by a temperature sensor T1 at the flow V.

Figure 7:
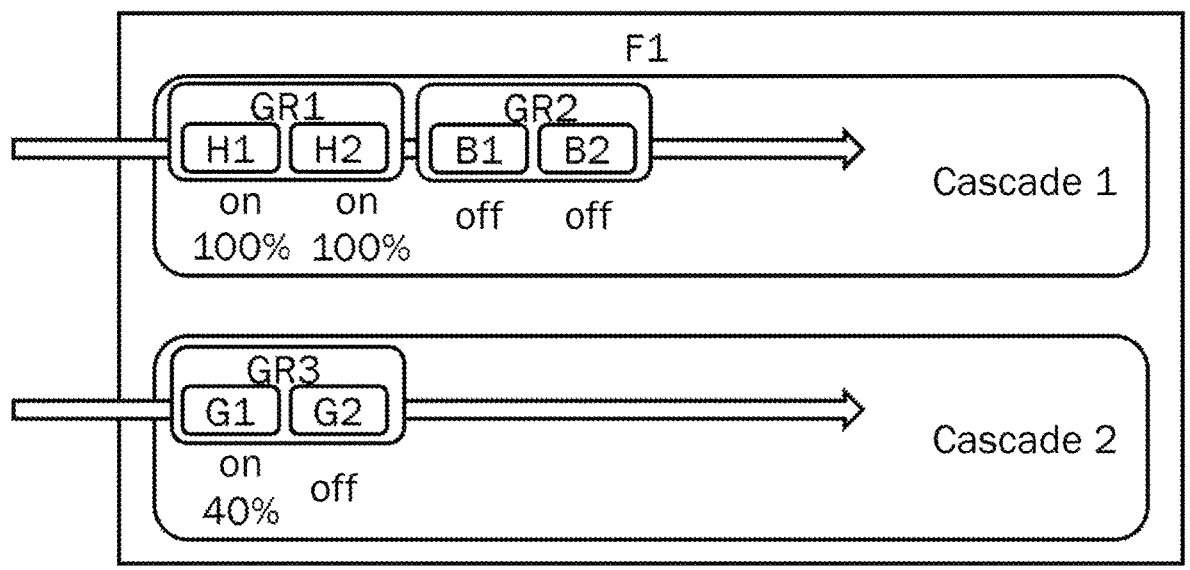
FIG. 7 shows a classification of the energy generators of the seventh embodiment into cascades and groups.

FIG. 7 illustrates the classification of the energy generators of the seventh embodiment into groups and cascades. In addition, an exemplary system condition is displayed, in which the two wood boilers H1-H2 of the first group GR1 are both switched on and run under full load. The two CHPs B1-B2 of the second group GR2 are switched off. The first gas boiler G1 is switched on and is operated in a modulating manner at a load of currently 40%.

Sixth Embodiment

In a sixth embodiment, the operation of the method according to the invention will be described in detail. The method is aimed at minimizing switch on/off operations of energy generators as much as possible. In other words, one goal of the method is to avoid generator pulsing.

In certain energy generators, such as a CHP or a heat pump, there is (for physically reasons) a coupling between several energy forms F1-F3. Accordingly, these energy generators may also be affected by energy supply requests EA from different energy forms F1-F3. The energy supply requests EA of the individual energy forms F1-F3 are generated independently of each other and may therefore also make conflicting requests to energy generators.

One way of resolving conflicts due to contradictory requests to energy generators consists of implementing the above-described principle "ON before OFF" (see first embodiment). That is, a switch-on request ON is always given priority over a switch-off request OFF. However, there may be a disadvantage in that an oversupply of one of the energy forms F1-F3 is generated, as a result of which the consumption of the energy supply system may be higher than necessary. Issuing a request for switching on an energy generator is also referred to as requesting the energy generator below. Eliminating a request to switch on an energy generator does not necessarily lead to switching off the energy generator, as will be explained in greater detail below with reference to examples. Even a switch-off request OFF does not necessarily mean that an energy generator is switched off.

If a lock is issued to an energy generator, or if there is a generator-specific criterion which prevents switching on an energy generator, then this circumstance is taken into account by the control device S when generating switch-on requests ON. The affected energy generator is disregarded for the duration of the lock in controlling the energy supply system. In particular, when an order of switching on and/or off has been set, a locked energy generator is skipped when executing the order. This prevents the control from getting stuck on the locked energy generator and no longer optimally fulfilling an energy supply request EA.

The control device controls the energy generators based on the energy form(s) F1-F3 provided by them. For this purpose, the energy generators are assigned to the energy forms F1-F3 which they can provide. If there is an energy supply request EA, the control device S determines which energy generators are to be given a request for switching on more than one energy form F1-F3, or the control device determines, for each energy form F1-F3 requested by the present energy supply request(s) EA which of the available energy generators are required to meet the energy supply request(s) EA. As a result, the control device generates switch-on requests ON for the energy generators required to meet the power-supply request(s) EA and preferably also switch-off requests OFF for the energy generators not required to meet the energy supply request(s) EA. In particular, the control device may represent the determined switch-on requests ON and switch-off requests OFF, for example, as a matrix (see FIG. 8) which will be described in more detail below.

It may be necessary to estimate the energy demand of a first energy form, for example heat F1, in advance in order to be able to judge whether an energy generator requested by a second energy form, for example electrical energy F2, is needed to meet the energy demand of the first energy form F1, If this is the case, energy generators requested by the second energy form F2 may continue to operate even if the demand of the second energy form F2 for providing the first energy form F1 is eliminated, as a result of which unnecessary switching operations may be avoided. Avoiding switching operations may increase the durability of energy generators and reduce the time required to reach a target value.

Figure 8:
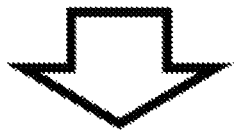
FIG. 8 shows an example of a request matrix.

The requests of the different energy forms may be summarized in a request matrix. The upper matrix in FIG. 8 is an example of a request matrix for five energy generators E1-E5 and three energy forms F1-F3. In the columns the energy generators E1-E5 are listed and in the rows the energy forms F1-F3 are listed. An entry of the matrix may include a switch-on request (ON), a switch-off request (OFF), an indication that the energy generator E1-E5 does not offer the respective energy form F1-F3 ("not applicable", N/A), or a lock ("hard OFF") of the energy generator E1-E5. Thus, the matrix contains all the information about the requirements of the individual energy forms F1-F3 for the individual energy generators E1-E5.

In the example shown, the energy generator E3 is being serviced and therefore cannot be used. In the request matrix a "hard OFF" is listed. Energy generator E1 receives a switch-on request ON from the energy forms F1 and F2 and a switch-off request OFF from F3. Energy generator E4 can only provide energy forms F1 and F2, energy generator E5 only provide energy form F1.

The request matrix regulates the interaction between the energy forms F1-F3. The control device S may preferably include a coordinating unit K which is configured to coordinate the requests of the individual energy forms F1-F3 to the energy generators E1-E5.

In the evaluation of the request matrix, a strategy can be pursued in which energy generators E1-E5 which can provide more than one energy form F1-F3 and have received a switch-on request ON for an energy form F1-F3, can no longer switched off by other energy forms F1-F3. This can be achieved, for example, using the rules "ON before OFF" or "OFF before ON" already described. Alternatively, the energy forms F1-F3 can be prioritized. The energy form F1-F3 with the highest prioritization which issues a switch-on request to an energy generator E1-E5 becomes the so-called master over the energy generator E1-E5.

Taking into account the prioritization of the energy forms F1-F3 or the rule "ON before OFF" or "OFF before ON", a so-called external request matrix (FA matrix for short) may be determined from the request matrix. The FA matrix receives, for each energy form F1-F3 and each energy generator E1-E5, information whether the corresponding energy generator E1-E5 of an energy form F1-F3 with higher priority (master) has received a switch-on request ON. The switch-on request ON of the master energy form F1-F3 is also referred to as external request (FA) with respect to the energy forms F1-F3 with lower priority. Accordingly, the FA matrix may have one or more entries "FA". As long as an energy generator E1-E5 has an entry "FA" in the FA matrix for an energy form F1-F3, it can no longer be switched off by this energy form F1-F3.

In particular, it is therefore advantageous to determine one of the energy forms F1-F3 as the master for an energy generator E1-E5 in order to avoid that an initially externally requested FA energy generator E1-E5 can no longer be switched off due to a sweeping acceptance of the external request FA. Thus, if there were no master and all energy forms F1-F3 were equal in requesting an energy generator E1-E5, for example, all energy forms F1-F3 issue a switch-on request ON to the energy generator E1-E5, then the energy forms F1-F3 would respectively generate mutually external requirements FA, so that none of the energy forms F1-F3 could switch off the respective energy generator E1-E5 anymore.

FIG. 8 illustrates how an external request matrix (bottom) is created from the request matrix (top). For the first energy generator E1, there is a switch-on request ON for the first energy form F1 and the second energy form F2, respectively. The third energy form F3 issues a switch-off request OFF. In the presence of two switch-on requests ON, it must be decided which of the energy forms F1-F2 should adopt the energy generator E1 as the master. This can be achieved, for example, by prioritizing the energy forms F1-F2 or by determining which energy form F1-F2 has issued a switch-on request ON first. In the example of FIG. 8, the first energy form F1 becomes the master of E1. Therefore, the entries of the energy forms F2 and F3 in the FA matrix each show the entry "FA". In the case of the energy generators E2 and E4, there is only one switch-on request ON, so that in each case the energy form F1-F3 with the switch-on request ON becomes the master. The energy generators E3 and E5 both remain switched off. For them, no external request FA is generated.

As already mentioned, an energy form F1-F3 can be defined, for example, as a master over an energy generator E1-E5 if it has given the relevant energy generator E1-E5 a switch-on request ON first. The energy form F1-F3 can remain master until it withdraws its switch-on request ON or replaces it with a switch-off request OFF. If two energy forms F1-F3 issue a switch-on request E1-E5 at the same time, it is possible, for example, to fall back on a predetermined priority order of the energy forms F1-F3. When operating a CHP, such as in an energy supply system of the fifth embodiment, it would be useful to assign the energy form electric energy F2 the highest priority, since the energy form heat F1 is produced as a by-product.

Externally requested energy generators E1-E5 remain switched on and contribute to meeting the energy demand for all affected energy forms F1-F3, respectively. If an energy generator E1-E5 of the first energy form F1-F3 (master) is no longer requested, the energy generator can be adopted by a second energy form F1-F3, in which it was considered as externally requested (FA), if the energy generator E1-E5 is required to meet the energy supply request EA of the second energy form F1-F3. For this purpose, the control device S may perform an estimation of the expected energy demand. The second energy form F1-F3 issues a switch-on request ON to the respective energy generator E1-E5. If the first energy form F1-F3 withdraws its switch-on request ON or instead outputs a switch-off request OFF, the second energy form F1-F3 becomes the master of the respective energy generator E1-E5. In this way, it can be prevented that the energy generator E1-E5 is first switched off and then switched on again by a switch-on request ON of the second energy form F1-F3.

In order to decide whether an energy generator E1-E5 should continue to be operated by a second energy form F1-F3 after the withdrawal of a switch-on request ON by a first energy form F1-F3, the control device S may be configured to determine an expected energy demand. Furthermore, the control device S may be configured to estimate whether the demand can be covered by the released energy generators E1-E5, wherein all energy generators E1-E5 of the second energy form F1-F3 can make a contribution.

In order to determine the energy demand of a certain energy form F1-F3, so-called indicators may be considered. Each externally requested FA energy generator E1-E5 is assigned individual indicators, one indicator being another energy generator E1-E5 of the relevant energy form F1-F3. Once an indicator receives a request change (from ON to OFF or from OFF to ON), it can be assumed that either too much (ON to OFF) or too little (OFF to ON) energy is provided in the relevant energy form F1-F3. If an indicator receives a switch-on request after it was previously switched off (OFF to ON), this is an indication that the energy generators E1-E5 of the relevant energy form F1-F3 provide too little energy. In this case, the result of determining the energy demand is that the previously externally requested FA energy generator E1-E5 continues to be operated by the energy form F1-F3, i.e., accordingly receives a switch-on request ON from the energy form F1-F3. On the other hand, if an indicator is switched off (OFF to ON), this indicates an oversupply of energy of the energy form F1-F3, so that the previously externally requested FA energy generator E1-E5 is not adopted and receives a switch-off request OFF.

Indicators are preferably switchable (or controllable) energy generators E1-E5 within an energy form F1-F3. The energy generators E1-E5 are switched in accordance with a predetermined order of switching on and/or off. A distinction is made between switch-on indicators and switch-off indicators, each externally requested FA energy generator E1-E5 being assigned a switch-on indicator and/or a switch-off indicator by the controller. Issuing a switch-on request (OFF to ON) to a switch-on indicator means that an initially externally requested FA energy generator E1-E5 within the respective energy form F1-F3 is adopted by the energy form F1-F3, i.e., the energy form F1-F3 issues a switch-on request ON thereto. Issuing a switch-off request (ON to OFF) of a switch-off indicator results in an externally requested energy generator E1-E5 not being adopted by the energy form F1-F3. In the following, this method will be described in more detail by way of examples.

When allocating the indicators, a distinction is made between three modes that produce different effects. Either no clock reduction, a low clock reduction or a high clock reduction is desired, wherein clock reduction means that an operation of switching off and on again (or vice versa an operation of switching on and off again) of an energy generator E1-E5 is avoided.

If no clock reduction is to be realized, there is no adoption of the externally requested FA energy generator E1-E5. A small clock reduction is achieved when a demand-based adoption of the externally requested FA energy generator E1-E5 is performed along the lines of an order of switching on and/or off. In this case, therefore, a calculation of the expected energy demand must be carried out by the control device S. A high clock reduction can be achieved by a direct adoption of all externally requested FA energy generators E1-E5 dependent on the next switchable energy generator E1-E5 within the switch-on order.

The mode in which the control device S is to operate can either be set manually by a user, determined by a higher-level device or determined by the control device S itself on the basis of parameters (for example as a function of the season and/or an outside temperature). If the mode "no clock reduction" is selected, there will be no adoption of the externally requested energy generator E1-E5. That is, energy generators E1-E5 that are externally requested by a first energy form F1-F3 are no longer considered by the other energy forms F1-F3. For example, a first energy generator E1 is first given a switch-off request OFF by a first energy form F1. However, a second energy form F2 needs this energy generator E1 to meet the energy needs and issues a switch-on request ON to the energy generator E1. If no clock reduction occurs, this has the consequence that the energy generator E1 is first switched off and then switched on again. Thus, a frequent clocking (switching) of energy generators is not prevented, so that the wear due to switching on the energy generators E1-E5 may be relatively high.

In the "low clock reduction" mode, energy generators E1-E5 can be adopted by energy forms F1-F3 according to demand. According to demand means that the adoption is performed based on the expected energy demand calculated, in particular, by the control device S. In addition, the adoption can also be withdrawn if the demand changes. This mode also takes into account, for each energy form F1-F3, a predetermined order of switching on and/or off the energy generators E1-E5 within the energy form F1-F3. This means that the energy generators are normally switched on or off only in the order of switching on and/or off.

In the adoption according to demand, it can be assumed that a first energy generator E1 externally requested by a first energy form, for example heat F1, would also receive a switch-on request ON from a second energy form, for example electric current F2, if there were at least one further energy generator E2-E5 in the order of switching behind the first energy generator E1 that receives a switch-on request ON from the second energy form F2. Therefore, in the determination of the switch-on indicator of an externally adopted energy generator E1 only switchable energy generators E2-E5 are relevant which are placed behind the respective externally adopted energy generator E1 in the order of switching on. The energy generators E2-E5 which are placed before the respective externally adopted energy generator E1 in the order of switching on, cannot be switch-on indicators. Of all eligible energy generators E2-E5, in particular that energy generator E2-E5 is determined as a switch-on indicator which has the smallest distance to the respective externally adopted energy generator E1 in the order of switching on.

Figure 9:
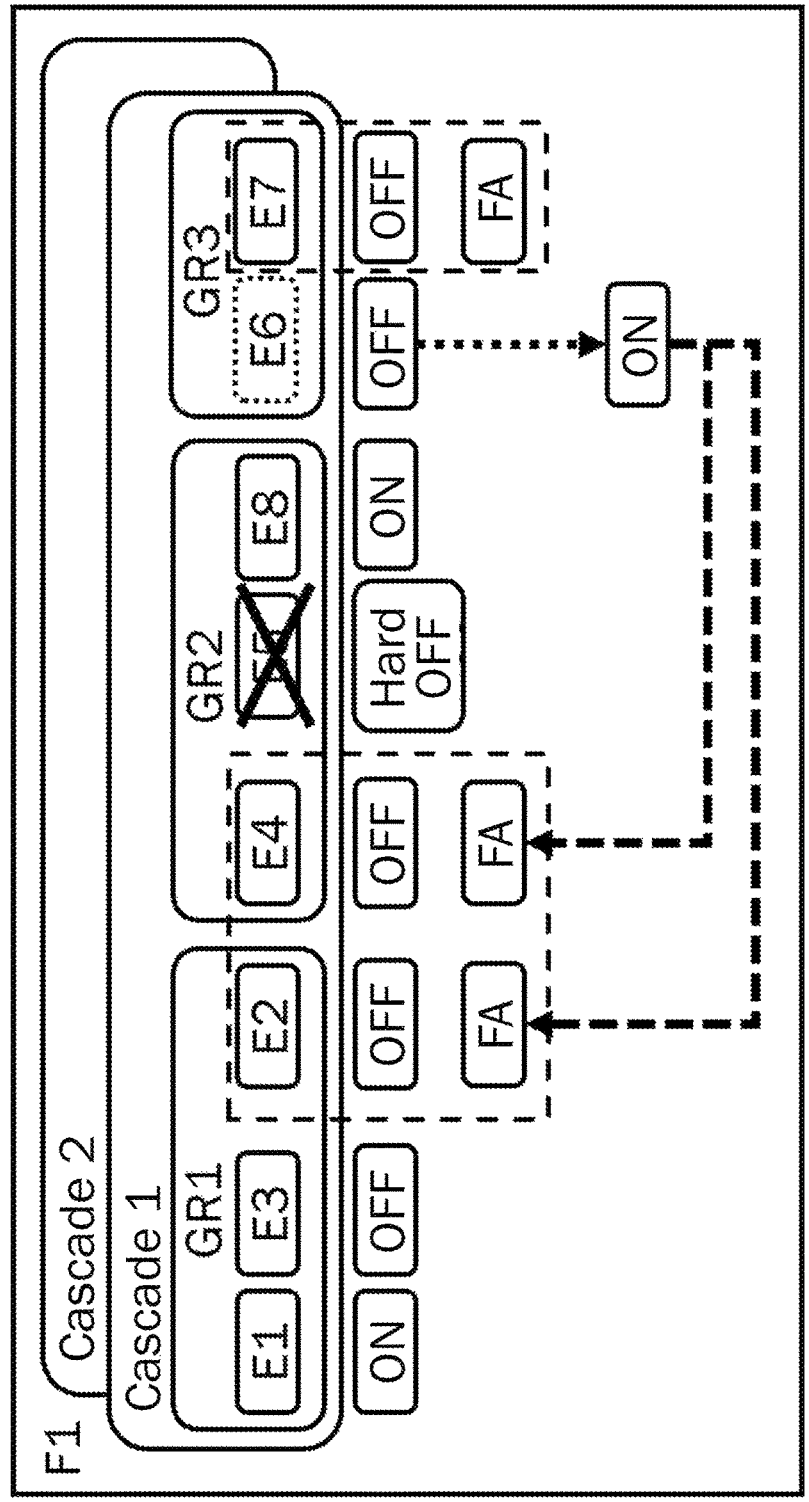
FIG. 9 illustrates a concept of demand-based adoption of energy generators with switch-on indicators in accordance with a "low clock reduction" mode.

Based on the illustration in FIG. 9, the above-described concept of demand-based adoption and switch-on indicators is exemplified. FIG. 9 shows eight energy generators E1-E8 of a first energy form F1 which are arranged in a first order of switching on and/or off (cascade 1). Furthermore, there may be other cascades with orders of switching on and/or off executable independently of the first cascade 1. Among the energy generators E1-E8, the switch-on requests ON and/or switch-off requests OFF of the first energy form F1 are respectively shown. Energy generators E1 and E8 have a switch-on request ON issued by the energy form F1. The remaining energy generators E2-E7 have switch-off requests OFF, with energy generator E5 having a hard-OFF lock so that it cannot be switched on. Energy generators E2, E4 and E7 which have been given a switch-off request OFF from energy form F1, are externally requested FA by switch-on requests ON from other energy forms, respectively. The following describes under which conditions one of the externally requested energy generators E2, E4 and E7 can be adopted by energy form F1.

First, it is determined which of the energy generators with the switch-off request OFF present may serve as the switch-on indicator. Energy generator E3 is, after E1, the first energy generator which can be switched on in the order of switching on in cascade 1 of the energy form F1. However, since the energy generator E3 precedes all the externally requested energy generators E2, E4, E7 in the order of switching on (from left to right), it cannot be a switch-on indicator for any of these energy generators E2, E4, E7 in the "low clock reduction" mode. In other words, switching on only E3 would not be result in an adoption of one of the energy generators E2, E4, E7 in the energy form F1.

The two energy generators E2 and E4 are externally requested FA and are preceding an energy generator which can be switched on in the order of switching on, namely the energy generator E6. Accordingly, E6 is the switch-on indicator for E2 and E4. In other words, switching E6 on (dotted-line arrow from OFF to ON) would result in the adoption of the externally requested energy generators E2 and E4. The energy form F1 would thus issue a switch-on request ON to the energy generators E2 and E4, respectively, when it first issues a switch-on request ON to the energy generator E6 according to the order. However, since the energy generator E6 in the present example of FIG. 9 is only behind the energy generator E3 in the order of switching on, the energy generator E6 could only be switched on simultaneously with or after switching on the energy generator E3.

Upon the adoption of the two externally requested energy generators E2 and E4, the control device S could decide, depending on a calculated energy demand, that the switch-on indicator itself, i.e., the energy generator E6, is not even switched on despite the switch-on request ON, and the switch-on request ON for E6 is replaced again by a switch-off request OFF. This is the case, in particular, when the calculated energy demand can be met by the adopted energy generators E2 and E4.

The adoption of the externally requested energy generators E2 and E4 is indicated in FIG. 9 by the arrows with the dashed lines. The energy generator E7 has no subsequent energy generator in the order which can be switched on. Thus, the energy generator E7 has no switch-on indicator and could not be adopted by the energy form F1.

The same basic idea applies to the determination of the switch-off indicator. The adoption of an externally requested energy generator is withdrawn when the last energy generator in the order behind the externally requested energy generator (to the right thereof) which can be switched off receives a switch-off request. If there is no further energy generator in the order which can be switched off, the first energy generator preceding the respective energy generator (to the left thereof) which can be switched off is used as the switch-off indicator. Of all the eligible energy generators, in particular the one which has the smallest distance in the order to the respective externally requested energy generator is determined as the switch-off indicator.

The control device S may further implement a "high clock reduction" mode. In this mode, the assumption holds that an energy generator that is externally requested for a second energy form F2 is always required to meet an energy demand of a first energy form F1 when any energy generator in an order of switching on of the first energy form F1 receives a switch-on request ON. The first energy generator which can be switched on is thus suitable as a switch-on indicator in an order of switching on within the first energy form F1.

Figure 10:
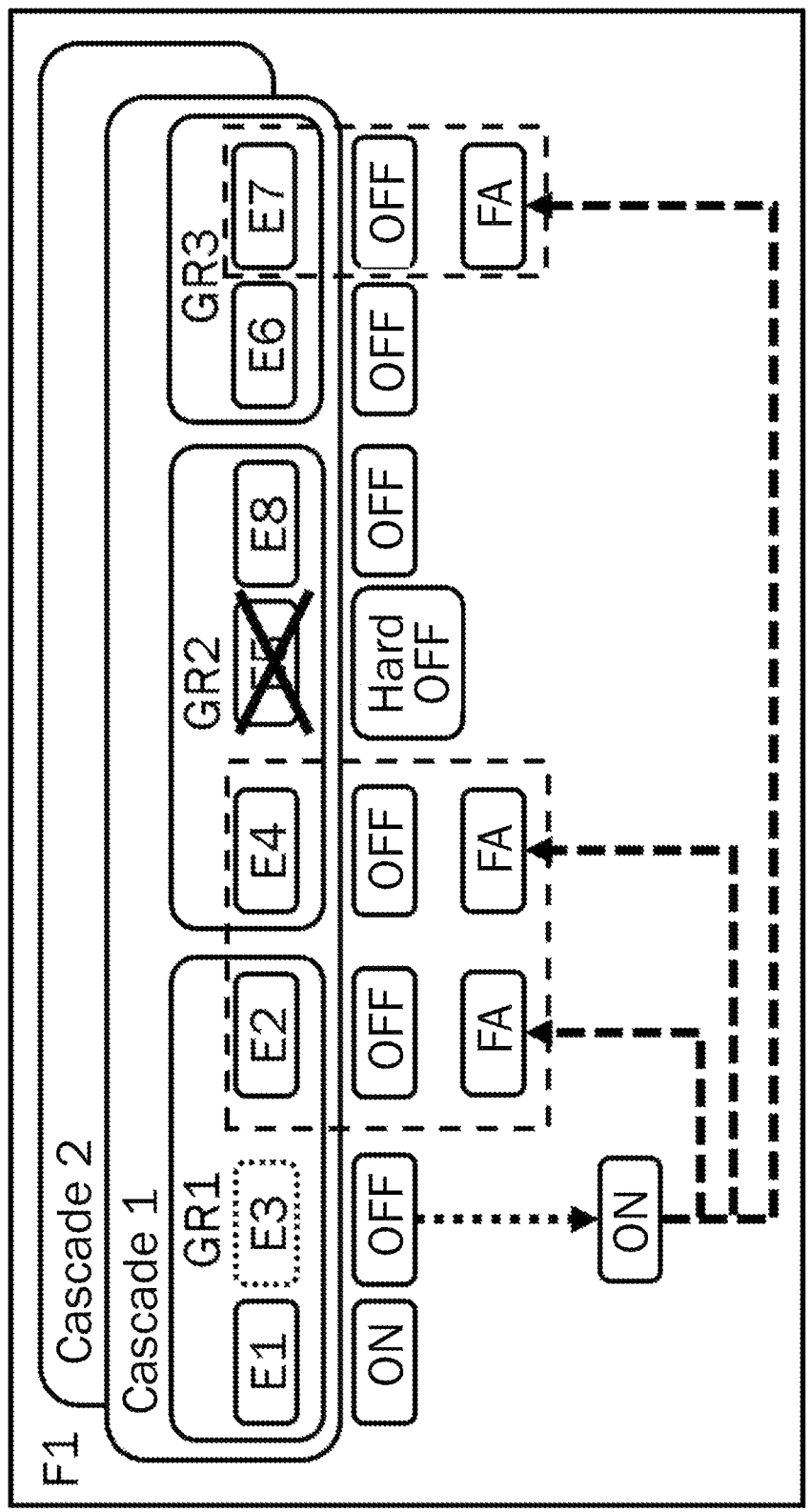
FIG. 10 illustrates a concept of demand-based adoption of energy generators with switch-on indicators according to a "high clock reduction" mode.

The mode "high clock reduction" will be explained in more detail with reference to the illustration in FIG. 10. FIG. 10 shows an example of determining the switch-on indicator in the "high clock reduction" mode. Here, the energy form F1 has eight energy generators E1-E8. It should be understood that the mode is similarly applicable to any other number of energy generators and is not limited to the exemplary number.

The three energy generators E2, E4, E7 of the example shown in FIG. 10 are externally requested by a second energy form F2. All externally requested energy generators E2, E4, E7 have the same switch-on indicator, namely the energy generator E3 which is the first energy generator in order of switching on of the first energy form F1 which can be switched on. Once the energy generator E3 receives a switch-on request ON for supplying energy of the first energy form F1 (dotted arrow from OFF to ON), all externally requested energy generators E2, E4, E7 are likewise given switch-on requests ON of the energy form F1 (dashed arrows).

The "high clock reduction" mode works without switch-off indicator. A withdrawal of the adopted external requests is not envisaged, since the adopted energy generators E2, E4, E7 should be derequested by switch-off criteria of the own energy form F1, after the externally requesting energy form F2 has withdrawn its request. The adopted energy generators E2, E4, E7 are then treated in exactly the same way as any other energy generator F1 in the energy form F1 for which a switch-on request ON is present. In particular, an energy generator is only switched off when each energy form F1, F2 issues a switch-off request OFF to the respective energy generator.

In summary, three rules for adopting energy generators were presented: no adoption, low clock reduction, and high clock reduction. The adoption can be performed using switch-on indicators or even without an indicator. In particular, the switch-on indicator may be the next energy generator in the order of switching on behind (to the right of) the respective externally requested energy generator which can be switched on. The energy generators placed ahead of (to the left of) the respective externally requested energy generator in the order of switching on are not considered as switch-on indicators in this mode of operation.

In particular, the switch-off indicator is the energy generator which, in the order of switching on, is the last energy generator behind (to the right of) the respective externally requested energy generator which can be switched off. In particular, the switch-off indicator has the smallest distance from the externally requested energy generator among all the energy generators within the order of switching on or off which can be switched off. If there is no energy generator that meets these criteria, the first energy generator placed ahead (to the left of) the respective energy generator in the order of switching on or off is used as a switch-off indicator.

In the above-described methods, it should be noted that the control device S may be configured to perform calculations for controlling the energy supply system periodically at predetermined times k. In each calculation step k, only one energy form F1-F3 can be the so-called master for an energy generator. An energy form F1-F3 can remain the master until it withdraws its request. If, in a calculation step k, several energy forms F1-F3 issue a switch-on request ON to an energy generator, in particular the highest prioritized energy form F1-F3 can become the master of the energy generator. This situation can occur, in particular, when a master energy form F1-F3 withdraws its switch-on request ON and other energy forms F1-F3 wish to adopt the energy generator. In that case, the energy generator is "inherited" by the subsequent energy form F1-F3.

The features disclosed in the foregoing description, the claims and the drawings may be of importance for the realization of the invention in its various forms both individually and in any combination.

LIST OF REFERENCE SYMBOLS

V flow
R return flow
S control device
S1 first control unit
S2 second control unit
S3 third control unit
K coordinating unit
P buffer storage
R1 first closed-loop controller
R2 second closed-loop controller
R3 third closed-loop controller
R4 fourth closed-loop controller
R5 fifth closed-loop controller
E1 first energy generator
E2 second energy generator
E3 third energy generator
E4 fourth energy generator
E5 fifth energy generator
G1 first gas boiler
G2 second gas boiler
B1 first CHP
B2 second CHP
H1 first wood boiler
H2 second wood boiler
GR1 first group
GR2 second group
GR3 third group
F1 first energy form (heat)
F2 second energy form (electrical energy)
F3 third energy form (cold)

The invention claimed is:

1. A method of controlling an energy supply system, the energy supply system including at least two energy generators (E1-E5, B1-B2, G1-G2, H1-H2) that are each configured to provide at least one energy form of heat (F1) and/or cold (F3) and/or electrical energy (F2) and at least one of which is configured to simultaneously provide at least two forms of energy (F1-F3), at least two closed-loop controllers (R1-R5) that each control a respective one of the energy generators (E1-E5, B1-B2, G1-G2, H1-H2), and a control device (S) for coordinatedly controlling the closed-loop controllers (R1-R5), the method comprising the steps of:
   detecting an energy supply request (EA) to provide energy in the form of heat (F1) and/or cold (F3) and/or electrical energy (F2);
   for each energy form (F1-F3), determining which energy generators (E1-E5, B1-B2, G1-G2, H1-H2) are required to meet the energy supply request (EA);
   for each energy form (F1-F3), generating switch-on requests (ON) for the energy generators (E1-E5, B1-B2, G1-G2, H1-H2) required to meet the energy supply request (EA) and generating switch-off requests (OFF) for the energy generators (E1-E5, B1-B2, G1-G2, H1-H2) not required to meet the energy supply request (EA);
   for each energy generator (E1-E5, B1-B2, G1-G2, H1-H2), determining if one, several or no switch-on request (ON) is present;
   for each energy generator (E1-E5, B1-B2, G1-G2, H1-H2), determining if one, several or no switch-off request (OFF) is present;
   for each energy generator (E1-E5, B1-B2, G1-G2, H1-H2) for which there is at least one switch-on request (ON) present, outputting the switch-on request (ON) to the corresponding closed-loop controller, and, for each energy generator (E1-E5, B1-B2, G1-G2, H1-H2) for which there is no switch-on request (ON) and at least one switch-off request (OFF) present, outputting the switch-off request (OFF) to the corresponding closed-loop controller; or
   for each generator (E1-E5, B1-B2, G1-G2, H1-H2) for which there is at least one switch-off request (OFF) present, outputting the switch-off request (OFF) to the corresponding closed-loop controller and, for each generator (E1-E5, B1-B2, G1-G2, H1-H2) for which there is no switch-off request (OFF) and at least one switch-on request (ON) present, outputting the switch-on request (ON) to the corresponding closed-loop controller;
   determining a first energy generator (E1) configured to simultaneously provide a first energy form (F1-F3) and a second energy form (F1-F3) for which a switch-on request (ON) of the first energy form (F1-F3) and a switch-off request (OFF) of the second energy form (F1-F3) is present;
   determining a second energy generator (E2) configured to provide the second energy form (F1-F3) for which a switch-on request (ON) of the second energy form (F1-F3) is present;
   generating a switch-on request (ON) of the second energy form (F1-F3) for the first energy generator (E1); and
   generating a switch-off request (OFF) of the second energy form (F1-F3) for the second energy generator (E2).

2. The method according to claim 1, further comprising the steps of:
   for each energy generator (E1-E5, B1-B2, G1-G2, H1-H2), determining target values (SW) to meet the energy supply request (EA) based on the determined switch-on request(s) (ON) and/or switch-off request(s) (OFF); and
   outputting the target values (SW) to the closed-loop controllers (R1-R5).

3. The method according to claim 1, wherein the energy supply system is a multivalent energy supply system, the energy generators (E1-E5, B1-B2, G1-G2, H1-H2) of which use a total of at least two different energy carriers.

4. The method according to claim 1, further comprising the steps of:
   detecting or setting an order of switching on and/or off the energy generators (E1-E5, B1-B2, G1-G2, H1-H2) for each energy form (F1-F3); and
   determining the switch-on requests (ON) and/or switch-off requests (OFF) is performed based on the order.

5. The method according to claim 1, wherein at least one of the energy generators is a combined heat and power plant (CHP) configured to simultaneously provide energy in the form of heat (F1) and electrical energy (F3).

6. A method of controlling an energy supply system, the energy supply system including at least two energy generators (E1-E5, B1-B2, G1-G2, H1-H2) that are each configured to provide at least one energy form of heat (F1) and/or cold (F3) and/or electrical energy (F2), at least two closed-loop controllers (R1-R5) that each control a respective one of the energy generators (E1-E5, B1-B2, G1-G2, H1-H2), and a control device (S) for coordinatedly controlling the closed-loop controllers (R1-R5), the method comprising the steps of:

detecting an energy supply request (EA) to provide energy in the form of heat (F1) and/or cold (F3) and/or electrical energy (F2);

for each energy form (F1-F3), determining which energy generators (E1-E5, B1-B2, G1-G2, H1-H2) are required to meet the energy supply request (EA);

for each energy form (F1-F3), generating switch-on requests (ON) for the energy generators (E1-E5, B1-B2, G1-G2, H1-H2) required to meet the energy supply request (EA) and generating switch-off requests (OFF) for the energy generators (E1-E5, B1-B2, G1-G2, H1-H2) not required to meet the energy supply request (EA);

for each generator (E1-E5, B1-B2, G1-G2, H1-H2), determining if one, several or no switch-on request (ON) is present;

for each generator (E1-E5, B1-B2, G1-G2, H1-H2), determining if one, several or no switch-on request (OFF) is present;

for each energy form (F1-F3), setting a priority such that each energy form (F1-F3) receives a different priority; and for each energy generator (E1-E5, B1-B2, G1-G2, H1-H2) for which there is at least one switch-on request (ON) and at least one switch-off request (OFF) from different energy forms (F1-F3) present, outputting the switch-on request (ON) or switch-off request (OFF) generated by the energy form (F1-F3) with higher priority to the corresponding closed-loop controller.

7. The method according to claim 2, further comprising the steps of:

for each energy generator (E1-E5, B1-B2, G1-G2, H1-H2), determining target values (SW) to meet the energy supply request (EA) based on the determined switch-on request(s) (ON) and/or switch-off request(s) (OFF); and outputting the target values (SW) to the closed-loop controllers (R1-R5).

8. The method according to claim 2, wherein at least one of the energy generators (E1-E5, B1-B2, G1-G2, H1-H2) is configured to simultaneously provide at least two forms of energy (F1-F3).

9. The method according to claim 8, further comprising the steps of:

determining a first energy generator (E1) configured to simultaneously provide a first energy form (F1-F3) and a second energy form (F1-F3) for which a switch-on request (ON) of the first energy form (F1-F3) and a switch-off request (OFF) of the second energy form (F1-F3) is present;

determining a second energy generator (E2) configured to provide the second energy form (F1-F3) for which a switch-on request (ON) of the second energy form (F1-F3) is present;

generating a switch-on request (ON) of the second energy form (F1-F3) for the first energy generator (E1); and generating a switch-off request (OFF) of the second energy form (F1-F3) for the second energy generator (E2).

10. The method according to claim 2, wherein the energy supply system is a multivalent energy supply system, the energy generators (E1-E5, B1-B2, G1-G2, H1-H2) of which use a total of at least two different energy carriers.

11. The method according to claim 2, further comprising the steps of:

detecting or setting an order of switching on and/or off the energy generators (E1-E5, B1-B2, G1-G2, H1-H2) for each energy form (F1-F3); and determining the switch-on requests (ON) and/or switch-off requests (OFF) is performed based on the order.

12. The method according to claim 2, wherein at least one of the energy generators is a combined heat and power plant (CHP) configured to simultaneously provide energy in the form of heat (F1) and electrical energy (F3).

13. A method of controlling an energy supply system, the energy supply system including at least two energy generators (E1-E5, B1-B2, G1-G2, H1-H2) that are each configured to provide at least one energy form of heat (F1) and/or cold (F3) and/or electrical energy (F2), at least two closed-loop controllers (R1-R5) that each control a respective one of the energy generators (E1-E5, B1-B2, G1-G2, H1-H2), and a control device (S) for coordinatedly controlling the closed-loop controllers (R1-R5), the method comprising the steps of:

(1) detecting an energy supply request (EA) for providing energy in the form of heat (F1) and/or cold (F3) and/or electrical energy (F2);

(2) for each energy form (F1-F3), determining which energy generators (E1-E5, B1-B2, G1-G2, H1-H2) are required to meet the energy supply request (EA);

(3) for each energy form (F1-F3), generating switch-on requests (ON) for the energy generators (E1-E5, B1-B2, G1-G2, H1-H2) required to meet the energy supply request (EA) and generating switch-off requests (OFF) for the energy generators (E1-E5, B1-B2, G1-G2, H1-H2) not required to meet the energy supply request (EA);

(4) determining a first energy generator (E1) configured to simultaneously provide a first energy form (F1-F3) and a second energy form (F1-F3) for which at a previous time (k-1) a switch-on request (ON) of the first energy form (F1-F3) and a switch-off request (OFF) for the second energy form (F1-F3) were present and for which there is a switch-off request (OFF) for the first energy form (F1-F3) present at the current time (k); and (5) if there is an energy supply request (EA) for providing the second energy form (F1-F3) present, generating a switch-on request (ON) of the second energy form (F1-F3) for the first energy generator (E1);

wherein steps (1) to (5) are performed periodically at predetermined discrete times (k).

14. The method according to claim 13, wherein generating the switch-on request (ON) of the second energy form (F1-F3) for the first energy generator (E1) is performed depending on whether or not a switch-on request (ON) for the second energy form (F1-F3) is issued at the present time (k) to a second energy generator (E2) configured to provide the second energy form (F1-F3) for which there was a switch-off request (OFF) of the second energy form (F1-F3) present at a previous time (k-1).

15. The method according to claim 13, wherein the energy supply system is a multivalent energy supply system, the energy generators (E1-E5, B1-B2, G1-G2, H1-H2) of which use a total of at least two different energy carriers.

16. The method according to claim 13, further comprising the steps of:

detecting or setting an order of switching on and/or off the energy generators (E1-E5, B1-B2, G1-G2, H1-H2) for each energy form (F1-F3), and determining the switch-on requests (ON) and/or switch-off requests (OFF) is performed based on the order.

17. The method according to claim 13, wherein at least one of the energy generators is a combined heat and power plant (CHP) configured to simultaneously provide energy in the form of heat (F1) and electrical energy (F3).

\* \* \* \* \*